United States Patent
Chatterjee et al.

(10) Patent No.: US 12,529,042 B2
(45) Date of Patent: *Jan. 20, 2026

(54) APPLICATIONS OF RECOMBINED SCCAS9 ENZYMES FOR PAM-FREE DNA MODIFICATION

(71) Applicant: Massachusetts Institute of Technology, Cambridge, MA (US)

(72) Inventors: Pranam Chatterjee, Cambridge, MA (US); Joseph M. Jacobson, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/841,639

(22) Filed: Jun. 15, 2022

(65) Prior Publication Data
US 2023/0193229 A1    Jun. 22, 2023

Related U.S. Application Data

(63) Continuation-in-part of application No. 16/689,071, filed on Nov. 19, 2019, now Pat. No. 11,453,865, which is a continuation-in-part of application No. 16/136,238, filed on Sep. 19, 2018, now abandoned.

(60) Provisional application No. 63/210,967, filed on Jun. 15, 2021, provisional application No. 62/769,520, filed on Nov. 19, 2018, provisional application No. 62/560,630, filed on Sep. 19, 2017.

(51) Int. Cl.
*C12N 9/22* (2006.01)
*C12N 15/10* (2006.01)
*C12N 15/113* (2010.01)
*C12N 15/85* (2006.01)
*C12N 15/90* (2006.01)

(52) U.S. Cl.
CPC ............ *C12N 9/22* (2013.01); *C12N 15/102* (2013.01); *C12N 15/113* (2013.01); *C12N 15/85* (2013.01); *C12N 15/907* (2013.01); *C12N 2310/20* (2017.05)

(58) Field of Classification Search
CPC ....................................................... C12N 9/22
See application file for complete search history.

(56) References Cited

PUBLICATIONS

Chaterjee et al., "An engineered ScCas9 with broad PAM range and high specificity and activity", Nature Biotechnology, Oct. 2020, vol. 38, pp. 1154-1158. Published on-line May 11, 2020.*
Walton et al., "Unconstrained Genome Targeting with near-PAMless Engineered CRISPR-Cas9 Variants", Science, Apr. 17, 2020, 368(6488): 290-296. doi:10.1126/science.aba8853.*
Nishimasu et al., "Engineered CRISPR-Cas9 nuclease with expanded targeting space", Science, 2018, 361, pp. 1259-1262.*

* cited by examiner

*Primary Examiner* — Suzanne M Noakes
(74) *Attorney, Agent, or Firm* — Norma E. Henderson

(57) ABSTRACT

SpRYc is a grafted ScCas9++-SpRY chimeric Cas9 possessing minimal 5'-NNN-3' PAM specificity. SpRYc comprises the N-terminus (residues 1-1119) of ScCas9++ (Sc++), including the flexible loop, followed by the region of SpRY (residues 1111-1368) spanning its PAM-interacting domain mutations. Methods of altering gene expression include use of SpRYc in complex with guide RNA in a CRISPR-Cas9 system.

6 Claims, 16 Drawing Sheets
Specification includes a Sequence Listing.

SEQUENCE LISTING

```
<160> NUMBER OF SEQ ID NOS: 28

<210> SEQ ID NO 1
<211> LENGTH: 1375
<212> TYPE: PRT
<213> ORGANISM: Streptococcus canis

<400> SEQUENCE: 1

Met Glu Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
            20                  25                  30

Lys Val Leu Gly Asn Thr Asn Arg Lys Ser Ile Lys Lys Asn Leu Met
        35                  40                  45

Gly Ala Leu Leu Phe Asp Ser Gly Glu Thr Ala Glu Ala Thr Arg Leu
    50                  55                  60

Lys Arg Thr Ala Arg Arg Arg Tyr Thr Arg Arg Lys Asn Arg Ile Arg
65                  70                  75                  80

Tyr Leu Gln Glu Ile Phe Ala Asn Glu Met Ala Lys Leu Asp Asp Ser
                85                  90                  95

Phe Phe Gln Arg Leu Glu Glu Ser Phe Leu Val Glu Glu Asp Lys Lys
            100                 105                 110

Asn Glu Arg His Pro Ile Phe Gly Asn Leu Ala Asp Glu Val Ala Tyr
        115                 120                 125

His Arg Asn Tyr Pro Thr Ile Tyr His Leu Arg Lys Lys Leu Ala Asp
    130                 135                 140

Ser Pro Glu Lys Ala Asp Leu Arg Leu Ile Tyr Leu Ala Leu Ala His
145                 150                 155                 160

Ile Ile Lys Phe Arg Gly His Phe Leu Ile Glu Gly Lys Leu Asn Ala
                165                 170                 175

Glu Asn Ser Asp Val Ala Lys Leu Phe Tyr Gln Leu Ile Gln Thr Tyr
            180                 185                 190

Asn Gln Leu Phe Glu Glu Ser Pro Leu Asp Glu Ile Glu Val Asp Ala
        195                 200                 205

Lys Gly Ile Leu Ser Ala Arg Leu Ser Lys Ser Lys Arg Leu Glu Lys
    210                 215                 220

Leu Ile Ala Val Phe Pro Asn Glu Lys Lys Asn Gly Leu Phe Gly Asn
225                 230                 235                 240

Ile Ile Ala Leu Ala Leu Gly Leu Thr Pro Asn Phe Lys Ser Asn Phe
                245                 250                 255

Asp Leu Thr Glu Asp Ala Lys Leu Gln Leu Ser Lys Asp Thr Tyr Asp
            260                 265                 270

Asp Asp Leu Asp Glu Leu Leu Gly Gln Ile Gly Asp Gln Tyr Ala Asp
        275                 280                 285

Leu Phe Ser Ala Ala Lys Asn Leu Ser Asp Ala Ile Leu Leu Ser Asp
    290                 295                 300

Ile Leu Arg Ser Asn Ser Glu Val Thr Lys Ala Pro Leu Ser Ala Ser
305                 310                 315                 320

Met Val Lys Arg Tyr Asp Glu His His Gln Asp Leu Ala Leu Leu Lys
                325                 330                 335
```

```
Thr Leu Val Arg Gln Gln Phe Pro Glu Lys Tyr Ala Glu Ile Phe Lys
            340                 345                 350

Asp Asp Thr Lys Asn Gly Tyr Ala Gly Tyr Val Gly Ala Asp Lys Lys
            355                 360                 365

Leu Arg Lys Arg Ser Gly Lys Leu Ala Thr Glu Glu Phe Tyr Lys
370                 375                 380

Phe Ile Lys Pro Ile Leu Glu Lys Met Asp Gly Ala Glu Glu Leu Leu
385                 390                 395                 400

Ala Lys Leu Asn Arg Asp Asp Leu Arg Arg Lys Gln Arg Thr Phe Asp
            405                 410                 415

Asn Gly Ser Ile Pro His Gln Ile His Leu Lys Glu Leu His Ala Ile
            420                 425                 430

Leu Arg Arg Gln Glu Glu Phe Tyr Pro Phe Leu Lys Glu Asn Arg Glu
            435                 440                 445

Lys Ile Glu Lys Ile Leu Thr Phe Arg Ile Pro Tyr Tyr Val Gly Pro
            450                 455                 460

Leu Ala Arg Gly Asn Ser Arg Phe Ala Trp Leu Thr Arg Lys Ser Glu
465                 470                 475                 480

Glu Ala Ile Thr Pro Trp Asn Phe Glu Glu Val Val Asp Lys Gly Ala
            485                 490                 495

Ser Ala Gln Ser Phe Ile Glu Arg Met Thr Asn Phe Asp Glu Gln Leu
            500                 505                 510

Pro Asn Lys Lys Val Leu Pro Lys His Ser Leu Leu Tyr Glu Tyr Phe
            515                 520                 525

Thr Val Tyr Asn Glu Leu Thr Lys Val Lys Tyr Val Thr Glu Arg Met
530                 535                 540

Arg Lys Pro Glu Phe Leu Ser Gly Glu Gln Lys Lys Ala Ile Val Asp
545                 550                 555                 560

Leu Leu Phe Lys Thr Asn Arg Lys Val Thr Val Lys Gln Leu Lys Glu
            565                 570                 575

Asp Tyr Phe Lys Lys Ile Glu Cys Phe Asp Ser Val Glu Ile Ile Gly
            580                 585                 590

Val Glu Asp Arg Phe Asn Ala Ser Leu Gly Thr Tyr His Asp Leu Leu
            595                 600                 605

Lys Ile Ile Lys Asp Lys Asp Phe Leu Asp Asn Glu Glu Asn Glu Asp
            610                 615                 620

Ile Leu Glu Asp Ile Val Leu Thr Leu Thr Leu Phe Glu Asp Arg Glu
625                 630                 635                 640

Met Ile Glu Glu Arg Leu Lys Thr Tyr Ala His Leu Phe Asp Asp Lys
            645                 650                 655

Val Met Lys Gln Leu Lys Arg Arg His Tyr Thr Gly Trp Gly Arg Leu
            660                 665                 670

Ser Arg Lys Met Ile Asn Gly Ile Arg Asp Lys Gln Ser Gly Lys Thr
            675                 680                 685

Ile Leu Asp Phe Leu Lys Ser Asp Gly Phe Ser Asn Arg Asn Phe Met
            690                 695                 700

Gln Leu Ile His Asp Asp Ser Leu Thr Phe Lys Glu Glu Ile Glu Lys
705                 710                 715                 720

Ala Gln Val Ser Gly Gln Gly Asp Ser Leu His Glu Gln Ile Ala Asp
            725                 730                 735

Leu Ala Gly Ser Pro Ala Ile Lys Lys Gly Ile Leu Gln Thr Val Lys
            740                 745                 750

Ile Val Asp Glu Leu Val Lys Val Met Gly His Lys Pro Glu Asn Ile
```

```
                755                 760                 765
Val Ile Glu Met Ala Arg Glu Asn Gln Thr Thr Thr Lys Gly Leu Gln
770                 775                 780

Gln Ser Arg Glu Arg Lys Lys Arg Ile Glu Glu Gly Ile Lys Glu Leu
785                 790                 795                 800

Glu Ser Gln Ile Leu Lys Glu Asn Pro Val Glu Asn Thr Gln Leu Gln
                805                 810                 815

Asn Glu Lys Leu Tyr Leu Tyr Tyr Leu Gln Asn Gly Arg Asp Met Tyr
                820                 825                 830

Val Asp Gln Glu Leu Asp Ile Asn Arg Leu Ser Asp Tyr Asp Val Asp
                835                 840                 845

His Ile Val Pro Gln Ser Phe Ile Lys Asp Asp Ser Ile Asp Asn Lys
                850                 855                 860

Val Leu Thr Arg Ser Val Glu Asn Arg Gly Lys Ser Asp Asn Val Pro
865                 870                 875                 880

Ser Glu Glu Val Val Lys Lys Met Lys Asn Tyr Trp Arg Gln Leu Leu
                885                 890                 895

Asn Ala Lys Leu Ile Thr Gln Arg Lys Phe Asp Asn Leu Thr Lys Ala
                900                 905                 910

Glu Arg Gly Gly Leu Ser Glu Ala Asp Lys Ala Gly Phe Ile Lys Arg
                915                 920                 925

Gln Leu Val Glu Thr Arg Gln Ile Thr Lys His Val Ala Arg Ile Leu
                930                 935                 940

Asp Ser Arg Met Asn Thr Lys Arg Asp Lys Asn Asp Lys Pro Ile Arg
945                 950                 955                 960

Glu Val Lys Val Ile Thr Leu Lys Ser Lys Leu Val Ser Asp Phe Arg
                965                 970                 975

Lys Asp Phe Gln Leu Tyr Lys Val Arg Asp Ile Asn Asn Tyr His His
                980                 985                 990

Ala His Asp Ala Tyr Leu Asn Ala Val Val Gly Thr Ala Leu Ile Lys
                995                 1000                1005

Lys Tyr Pro Lys Leu Glu Ser Glu Phe Val Tyr Gly Asp Tyr Lys
                1010            1015            1020

Val Tyr Asp Val Arg Lys Met Ile Ala Lys Ser Glu Gln Glu Ile
                1025            1030            1035

Gly Lys Ala Thr Ala Lys Arg Phe Phe Tyr Ser Asn Ile Met Asn
                1040            1045            1050

Phe Phe Lys Thr Glu Val Lys Leu Ala Asn Gly Glu Ile Arg Lys
                1055            1060            1065

Arg Pro Leu Ile Glu Thr Asn Gly Glu Thr Gly Glu Val Val Trp
                1070            1075            1080

Asn Lys Glu Lys Asp Phe Ala Thr Val Arg Lys Val Leu Ala Met
                1085            1090            1095

Pro Gln Val Asn Ile Val Lys Lys Thr Glu Val Gln Thr Gly Gly
                1100            1105            1110

Phe Ser Lys Glu Ser Ile Leu Ser Lys Arg Glu Ser Ala Lys Leu
                1115            1120            1125

Ile Pro Arg Lys Lys Gly Trp Asp Thr Arg Lys Tyr Gly Gly Phe
                1130            1135            1140

Gly Ser Pro Thr Val Ala Tyr Ser Ile Leu Val Val Ala Lys Val
                1145            1150            1155

Glu Lys Gly Lys Ala Lys Lys Leu Lys Ser Val Lys Val Leu Val
                1160            1165            1170
```

```
Gly Ile Thr Ile Met Glu Lys Gly Ser Tyr Glu Lys Asp Pro Ile
    1175            1180            1185

Gly Phe Leu Glu Ala Lys Gly Tyr Lys Asp Ile Lys Lys Glu Leu
    1190            1195            1200

Ile Phe Lys Leu Pro Lys Tyr Ser Leu Phe Glu Leu Glu Asn Gly
    1205            1210            1215

Arg Arg Arg Met Leu Ala Ser Ala Lys Glu Leu Gln Lys Ala Asn
    1220            1225            1230

Glu Leu Val Leu Pro Gln His Leu Val Arg Leu Leu Tyr Tyr Thr
    1235            1240            1245

Gln Asn Ile Ser Ala Thr Thr Gly Ser Asn Asn Leu Gly Tyr Ile
    1250            1255            1260

Glu Gln His Arg Glu Glu Phe Lys Glu Ile Phe Glu Lys Ile Ile
    1265            1270            1275

Asp Phe Ser Glu Lys Tyr Ile Leu Lys Asn Lys Val Asn Ser Asn
    1280            1285            1290

Leu Lys Ser Ser Phe Asp Glu Gln Phe Ala Val Ser Asp Ser Ile
    1295            1300            1305

Leu Leu Ser Asn Ser Phe Val Ser Leu Leu Lys Tyr Thr Ser Phe
    1310            1315            1320

Gly Ala Ser Gly Gly Phe Thr Phe Leu Asp Leu Asp Val Lys Gln
    1325            1330            1335

Gly Arg Leu Arg Tyr Gln Thr Val Thr Glu Val Leu Asp Ala Thr
    1340            1345            1350

Leu Ile Tyr Gln Ser Ile Thr Gly Leu Tyr Glu Thr Arg Thr Asp
    1355            1360            1365

Leu Ser Gln Leu Gly Gly Asp
    1370            1375

<210> SEQ ID NO 2
<211> LENGTH: 1377
<212> TYPE: PRT
<213> ORGANISM: Streptococcus pyogenes

<400> SEQUENCE: 2

Met Glu Lys Lys Tyr Ser Ile Gly Leu Asp Ile Gly Thr Asn Ser Val
1               5                   10                  15

Gly Trp Ala Val Ile Thr Asp Asp Tyr Lys Val Pro Ser Lys Lys Phe
                20                  25                  30

Lys Val Leu Gly Asn Thr Asn Arg Lys Ser Ile Lys Lys Asn Leu Met
            35                  40                  45

Gly Ala Leu Leu Phe Asp Ser Gly Glu Thr Ala Glu Ala Thr Arg Leu
        50                  55                  60

Lys Arg Thr Ala Arg Arg Arg Tyr Thr Arg Arg Lys Asn Arg Ile Arg
65                  70                  75                  80

Tyr Leu Gln Glu Ile Phe Ala Asn Glu Met Ala Lys Leu Asp Asp Ser
                85                  90                  95

Phe Phe Gln Arg Leu Glu Glu Ser Phe Leu Val Glu Glu Asp Lys Lys
                100                 105                 110

Asn Glu Arg His Pro Ile Phe Gly Asn Leu Ala Asp Glu Val Ala Tyr
            115                 120                 125

His Arg Asn Tyr Pro Thr Ile Tyr His Leu Arg Lys Lys Leu Ala Asp
        130                 135                 140

Ser Pro Glu Lys Ala Asp Leu Arg Leu Ile Tyr Leu Ala Leu Ala His
```

```
            145                 150                 155                 160
        Ile Ile Lys Phe Arg Gly His Phe Leu Ile Glu Gly Lys Leu Asn Ala
                        165                 170                 175
        Glu Asn Ser Asp Val Ala Lys Leu Phe Tyr Gln Leu Ile Gln Thr Tyr
                        180                 185                 190
        Asn Gln Leu Phe Glu Glu Ser Pro Leu Asp Glu Ile Glu Val Asp Ala
                        195                 200                 205
        Lys Gly Ile Leu Ser Ala Arg Leu Ser Lys Ser Lys Arg Leu Glu Lys
                        210                 215                 220
        Leu Ile Ala Val Phe Pro Asn Glu Lys Lys Asn Gly Leu Phe Gly Asn
        225                 230                 235                 240
        Ile Ile Ala Leu Ala Leu Gly Leu Thr Pro Asn Phe Lys Ser Asn Phe
                        245                 250                 255
        Asp Leu Thr Glu Asp Ala Lys Leu Gln Leu Ser Lys Asp Thr Tyr Asp
                        260                 265                 270
        Asp Asp Leu Asp Glu Leu Leu Gly Gln Ile Gly Asp Gln Tyr Ala Asp
                        275                 280                 285
        Leu Phe Ser Ala Ala Lys Asn Leu Ser Asp Ala Ile Leu Leu Ser Asp
                        290                 295                 300
        Ile Leu Arg Ser Asn Ser Glu Val Thr Lys Ala Pro Leu Ser Ala Ser
        305                 310                 315                 320
        Met Val Lys Arg Tyr Asp Glu His His Gln Asp Leu Ala Leu Leu Lys
                        325                 330                 335
        Thr Leu Val Arg Gln Gln Phe Pro Glu Lys Tyr Ala Glu Ile Phe Lys
                        340                 345                 350
        Asp Asp Thr Lys Asn Gly Tyr Ala Gly Tyr Val Gly Ala Asp Lys Lys
                        355                 360                 365
        Leu Arg Lys Arg Ser Gly Lys Leu Ala Thr Glu Glu Phe Tyr Lys
                        370                 375                 380
        Phe Ile Lys Pro Ile Leu Glu Lys Met Asp Gly Ala Glu Glu Leu Leu
        385                 390                 395                 400
        Ala Lys Leu Asn Arg Asp Asp Leu Leu Arg Lys Gln Arg Thr Phe Asp
                        405                 410                 415
        Asn Gly Ser Ile Pro His Gln Ile His Leu Lys Glu Leu His Ala Ile
                        420                 425                 430
        Leu Arg Arg Gln Glu Gly Phe Tyr Pro Phe Leu Lys Glu Asn Arg Glu
                        435                 440                 445
        Lys Ile Glu Lys Ile Leu Thr Phe Arg Ile Pro Tyr Tyr Val Gly Pro
        450                 455                 460
        Leu Ala Arg Gly Asn Ser Arg Phe Ala Trp Leu Thr Arg Lys Ser Glu
        465                 470                 475                 480
        Glu Ala Ile Thr Pro Trp Asn Phe Glu Glu Val Val Asp Lys Gly Ala
                        485                 490                 495
        Ser Ala Gln Ser Phe Ile Glu Arg Met Thr Asn Phe Asp Glu Gln Leu
                        500                 505                 510
        Pro Asn Lys Lys Val Leu Pro Lys His Ser Leu Leu Tyr Glu Tyr Phe
                        515                 520                 525
        Thr Val Tyr Asn Glu Leu Thr Lys Val Lys Tyr Val Thr Glu Arg Met
                        530                 535                 540
        Arg Lys Pro Glu Phe Leu Ser Gly Glu Gln Lys Lys Ala Ile Val Asp
        545                 550                 555                 560
        Leu Leu Phe Lys Thr Asn Arg Lys Val Thr Val Lys Gln Leu Lys Glu
                        565                 570                 575
```

-continued

Asp Tyr Phe Lys Lys Ile Glu Cys Phe Asp Ser Val Glu Ile Ile Gly
            580                 585                 590

Val Glu Asp Arg Phe Asn Ala Ser Leu Gly Thr Tyr His Asp Leu Leu
            595                 600                 605

Lys Ile Ile Lys Asp Lys Asp Phe Leu Asp Asn Glu Glu Asn Glu Asp
610                 615                 620

Ile Leu Glu Asp Ile Val Leu Thr Leu Thr Leu Phe Glu Asp Arg Glu
625                 630                 635                 640

Met Ile Glu Glu Arg Leu Lys Thr Tyr Ala His Leu Phe Asp Asp Lys
            645                 650                 655

Val Met Lys Gln Leu Lys Arg Arg His Tyr Thr Gly Trp Gly Arg Leu
            660                 665                 670

Ser Arg Lys Met Ile Asn Gly Ile Arg Asp Lys Gln Ser Gly Lys Thr
            675                 680                 685

Ile Leu Asp Phe Leu Lys Ser Asp Gly Phe Ser Asn Arg Asn Phe Met
            690                 695                 700

Gln Leu Ile His Asp Asp Ser Leu Thr Phe Lys Glu Glu Ile Glu Lys
705                 710                 715                 720

Ala Gln Val Ser Gly Gln Gly Asp Ser Leu His Glu Gln Ile Ala Asp
            725                 730                 735

Leu Ala Gly Ser Pro Ala Ile Lys Lys Gly Ile Leu Gln Thr Val Lys
            740                 745                 750

Ile Val Asp Glu Leu Val Lys Val Met Gly His Lys Pro Glu Asn Ile
            755                 760                 765

Val Ile Glu Met Ala Arg Glu Asn Gln Thr Thr Lys Gly Leu Gln
            770                 775                 780

Gln Ser Arg Glu Arg Lys Lys Arg Ile Glu Glu Gly Ile Lys Glu Leu
785                 790                 795                 800

Glu Ser Gln Ile Leu Lys Glu Asn Pro Val Glu Asn Thr Gln Leu Gln
            805                 810                 815

Asn Glu Lys Leu Tyr Leu Tyr Tyr Leu Gln Asn Gly Arg Asp Met Tyr
            820                 825                 830

Val Asp Gln Glu Leu Asp Ile Asn Arg Leu Ser Asp Tyr Asp Val Asp
            835                 840                 845

His Ile Val Pro Gln Ser Phe Ile Lys Asp Asp Ser Ile Asp Asn Lys
            850                 855                 860

Val Leu Thr Arg Ser Val Glu Asn Arg Gly Lys Ser Asp Asn Val Pro
865                 870                 875                 880

Ser Glu Glu Val Val Lys Lys Met Lys Asn Tyr Trp Arg Gln Leu Leu
            885                 890                 895

Asn Ala Lys Leu Ile Thr Gln Arg Lys Phe Asp Asn Leu Thr Lys Ala
            900                 905                 910

Glu Arg Gly Gly Leu Ser Glu Ala Asp Lys Ala Gly Phe Ile Lys Arg
            915                 920                 925

Gln Leu Val Glu Thr Arg Gln Ile Thr Lys His Val Ala Arg Ile Leu
            930                 935                 940

Asp Ser Arg Met Asn Thr Lys Arg Asp Lys Asn Asp Lys Pro Ile Arg
945                 950                 955                 960

Glu Val Lys Val Ile Thr Leu Lys Ser Lys Leu Val Ser Asp Phe Arg
            965                 970                 975

Lys Asp Phe Gln Leu Tyr Lys Val Arg Asp Ile Asn Asn Tyr His His
            980                 985                 990

-continued

Ala His Asp Ala Tyr Leu Asn Ala Val Val Gly Thr Ala Leu Ile Lys
     995                 1000                 1005

Lys Tyr Pro Lys Leu Glu Ser Glu Phe Val Tyr Gly Asp Tyr Lys
1010                 1015                 1020

Val Tyr Asp Val Arg Lys Met Ile Ala Lys Ser Glu Gln Glu Ile
1025                 1030                 1035

Gly Lys Ala Thr Ala Lys Arg Phe Phe Tyr Ser Asn Ile Met Asn
1040                 1045                 1050

Phe Phe Lys Thr Glu Val Lys Leu Ala Asn Gly Glu Ile Arg Lys
1055                 1060                 1065

Arg Pro Leu Ile Glu Thr Asn Gly Glu Thr Gly Glu Val Val Trp
1070                 1075                 1080

Asn Lys Glu Lys Asp Phe Ala Thr Val Arg Lys Val Leu Ala Met
1085                 1090                 1095

Pro Gln Val Asn Ile Val Lys Lys Thr Glu Val Gln Thr Gly Gly
1100                 1105                 1110

Phe Ser Lys Glu Ser Ile Arg Pro Lys Arg Asn Ser Asp Lys Leu
1115                 1120                 1125

Ile Ala Arg Lys Lys Asp Trp Asp Pro Lys Lys Tyr Gly Gly Phe
1130                 1135                 1140

Leu Trp Pro Thr Val Ala Tyr Ser Val Leu Val Val Ala Lys Val
1145                 1150                 1155

Glu Lys Gly Lys Ser Lys Lys Leu Lys Ser Val Lys Glu Leu Leu
1160                 1165                 1170

Gly Ile Thr Ile Met Glu Arg Ser Ser Phe Glu Lys Asn Pro Ile
1175                 1180                 1185

Asp Phe Leu Glu Ala Lys Gly Tyr Lys Glu Val Lys Lys Asp Leu
1190                 1195                 1200

Ile Ile Lys Leu Pro Lys Tyr Ser Leu Phe Glu Leu Glu Asn Gly
1205                 1210                 1215

Arg Lys Arg Met Leu Ala Ser Ala Lys Gln Leu Gln Lys Gly Asn
1220                 1225                 1230

Glu Leu Ala Leu Pro Ser Lys Tyr Val Asn Phe Leu Tyr Leu Ala
1235                 1240                 1245

Ser His Tyr Glu Lys Leu Lys Gly Ser Pro Glu Asp Asn Glu Gln
1250                 1255                 1260

Lys Gln Leu Phe Val Glu Gln His Lys His Tyr Leu Asp Glu Ile
1265                 1270                 1275

Ile Glu Gln Ile Ser Glu Phe Ser Lys Arg Val Ile Leu Ala Asp
1280                 1285                 1290

Ala Asn Leu Asp Lys Val Leu Ser Ala Tyr Asn Lys His Arg Asp
1295                 1300                 1305

Lys Pro Ile Arg Glu Gln Ala Glu Asn Ile Ile His Leu Phe Thr
1310                 1315                 1320

Leu Thr Arg Leu Gly Ala Pro Arg Ala Phe Lys Tyr Phe Asp Thr
1325                 1330                 1335

Thr Ile Asp Pro Lys Gln Tyr Arg Ser Thr Lys Glu Val Leu Asp
1340                 1345                 1350

Ala Thr Leu Ile His Gln Ser Ile Thr Gly Leu Tyr Glu Thr Arg
1355                 1360                 1365

Ile Asp Leu Ser Gln Leu Gly Gly Asp
1370                 1375

-continued

```
<210> SEQ ID NO 3
<211> LENGTH: 20
<212> TYPE: DNA
<213> ORGANISM: Unknown
<220> FEATURE:
<223> OTHER INFORMATION: Gene/construct from library

<400> SEQUENCE: 3
agatccttgg cggcaagaaa                                                 20

<210> SEQ ID NO 4
<211> LENGTH: 20
<212> TYPE: DNA
<213> ORGANISM: Unknown
<220> FEATURE:
<223> OTHER INFORMATION: Gene/construct from library

<400> SEQUENCE: 4
cgcgggaaac ggtctgataa                                                 20

<210> SEQ ID NO 5
<211> LENGTH: 23
<212> TYPE: DNA
<213> ORGANISM: Unknown
<220> FEATURE:
<223> OTHER INFORMATION: Gene/construct from library

<400> SEQUENCE: 5
ccagaatgca caaagtactg cac                                             23

<210> SEQ ID NO 6
<211> LENGTH: 21
<212> TYPE: DNA
<213> ORGANISM: Unknown
<220> FEATURE:
<223> OTHER INFORMATION: Gene/construct from library

<400> SEQUENCE: 6
gccaaagccc gagagagtgc c                                               21

<210> SEQ ID NO 7
<211> LENGTH: 20
<212> TYPE: DNA
<213> ORGANISM: Unknown
<220> FEATURE:
<223> OTHER INFORMATION: Gene/construct from library

<400> SEQUENCE: 7
ctggaaagcc aatgcctgac                                                 20

<210> SEQ ID NO 8
<211> LENGTH: 20
<212> TYPE: DNA
<213> ORGANISM: Unknown
<220> FEATURE:
<223> OTHER INFORMATION: Gene/Construct from library

<400> SEQUENCE: 8
ggcagcaaac tccttgtcct                                                 20

<210> SEQ ID NO 9
<211> LENGTH: 20
<212> TYPE: DNA
<213> ORGANISM: Unknown
<220> FEATURE:
<223> OTHER INFORMATION: Gene/construct from library
```

<400> SEQUENCE: 9
agccagagct ccagtctgat                                                    20

<210> SEQ ID NO 10
<211> LENGTH: 20
<212> TYPE: DNA
<213> ORGANISM: Unknown
<220> FEATURE:
<223> OTHER INFORMATION: Gene/construct from library

<400> SEQUENCE: 10
cgggacttga ctcagaccac                                                    20

<210> SEQ ID NO 11
<211> LENGTH: 21
<212> TYPE: DNA
<213> ORGANISM: Unknown
<220> FEATURE:
<223> OTHER INFORMATION: Gene/construct from library

<400> SEQUENCE: 11
ttatgactag tggatccccc g                                                  21

<210> SEQ ID NO 12
<211> LENGTH: 20
<212> TYPE: DNA
<213> ORGANISM: Unknown
<220> FEATURE:
<223> OTHER INFORMATION: Genw/construct from library

<400> SEQUENCE: 12
gggactttcc acaccgtcaa                                                    20

<210> SEQ ID NO 13
<211> LENGTH: 20
<212> TYPE: DNA
<213> ORGANISM: Unknown
<220> FEATURE:
<223> OTHER INFORMATION: Gene/construct from library

<400> SEQUENCE: 13
ccgctcaggt tctgctttta                                                    20

<210> SEQ ID NO 14
<211> LENGTH: 20
<212> TYPE: DNA
<213> ORGANISM: Unknown
<220> FEATURE:
<223> OTHER INFORMATION: Gene/construct from library

<400> SEQUENCE: 14
ggctgaggca gcagcggctg                                                    20

<210> SEQ ID NO 15
<211> LENGTH: 697
<212> TYPE: DNA
<213> ORGANISM: Artificial Sequence
<220> FEATURE:
<223> OTHER INFORMATION: Synthetic Locus

<400> SEQUENCE: 15
acccatgtat gatgacccca ccctgcctga aggctggaca tggaagctta agcaaaggaa        60
atctggccgc tctgctggga agtatgatgt ttgttccttg tgtctttctg tttgtcccca       120
caagtcccca gggaaaagcc ttttgctcta aagtggagtt gattgcgtac ttcgaaaagg       180

-continued

```
taggcgacac atccctggac cctaatgatt ttgacttcat ggtaactggg agagggagcc    240
cctcccggtg agagcagaaa ccacctaaga agcccaaatc tcccaagctc caggaactgg    300
cagaggccgg ggacgcccca aagggagcgg caccacgaga cccaaggcgg ccacgtcaga    360
gggtgtgcag gtgaaaaggg tcctggagaa aagtcctggg aagctccttg tcaagatgcc    420
ttttcaaact tcgccagggg gcaaggctga gggggtggg gccaccacat ccacccaggt    480
catggtgatc aaacgccccg gcaggaagtg aaaagctgag gccgaccctc aggccattcc    540
caagaaacgg ggctgaaagc cggggatgtg gtggcagccg ctgccgccga ggccaaaaag    600
aaagccgtga agagtcttct atctgatctg tgcaggagac cgtactcccc atcaagaagt    660
caagacccgg gagacggtca gcatcgaggt caaggaa                             697

<210> SEQ ID NO 16
<211> LENGTH: 20
<212> TYPE: DNA
<213> ORGANISM: Unknown
<220> FEATURE:
<223> OTHER INFORMATION: crRNA sequence from library

<400> SEQUENCE: 16
gctgctgctg ctgctgctgg                                                 20

<210> SEQ ID NO 17
<211> LENGTH: 20
<212> TYPE: DNA
<213> ORGANISM: Unknown
<220> FEATURE:
<223> OTHER INFORMATION: crRNA sequence from library

<400> SEQUENCE: 17
agcttccatg tccagccttc                                                 20

<210> SEQ ID NO 18
<211> LENGTH: 20
<212> TYPE: DNA
<213> ORGANISM: Unknown
<220> FEATURE:
<223> OTHER INFORMATION: crRNA sequence from library

<400> SEQUENCE: 18
agagcaaaag gcttttccct                                                 20

<210> SEQ ID NO 19
<211> LENGTH: 20
<212> TYPE: DNA
<213> ORGANISM: Unknown
<220> FEATURE:
<223> OTHER INFORMATION: crRNA sequence from library

<400> SEQUENCE: 19
accatgaagt caaaatcatt                                                 20

<210> SEQ ID NO 20
<211> LENGTH: 20
<212> TYPE: DNA
<213> ORGANISM: Unknown
<220> FEATURE:
<223> OTHER INFORMATION: crRNA sequence from library

<400> SEQUENCE: 20
tgctctcacc gggaggggct                                                 20
```

<210> SEQ ID NO 21
<211> LENGTH: 20
<212> TYPE: DNA
<213> ORGANISM: Unknown
<220> FEATURE:
<223> OTHER INFORMATION: crRNA sequence from library

<400> SEQUENCE: 21
tcacttcctg ccggggcgtt                                              20

<210> SEQ ID NO 22
<211> LENGTH: 20
<212> TYPE: DNA
<213> ORGANISM: Unknown
<220> FEATURE:
<223> OTHER INFORMATION: crRNA sequence from library

<400> SEQUENCE: 22
tcagccccgt ttcttgggaa                                              20

<210> SEQ ID NO 23
<211> LENGTH: 20
<212> TYPE: DNA
<213> ORGANISM: Unknown
<220> FEATURE:
<223> OTHER INFORMATION: crRNA sequence from library

<400> SEQUENCE: 23
tcagatagaa gactccttca                                              20

<210> SEQ ID NO 24
<211> LENGTH: 20
<212> TYPE: DNA
<213> ORGANISM: Unknown
<220> FEATURE:
<223> OTHER INFORMATION: crRNA sequence from library

<400> SEQUENCE: 24
gcacttcttg atggggagta                                              20

<210> SEQ ID NO 25
<211> LENGTH: 20
<212> TYPE: DNA
<213> ORGANISM: Unknown
<220> FEATURE:
<223> OTHER INFORMATION: crRNA sequence from library

<400> SEQUENCE: 25
ggtgagtgag tgtgtgcgtg                                              20

<210> SEQ ID NO 26
<211> LENGTH: 20
<212> TYPE: DNA
<213> ORGANISM: Unknown
<220> FEATURE:
<223> OTHER INFORMATION: crRNA sequence from library

<400> SEQUENCE: 26
gagtccgagc agaagaagaa                                              20

<210> SEQ ID NO 27
<211> LENGTH: 20
<212> TYPE: DNA
<213> ORGANISM: Unknown
<220> FEATURE:
<223> OTHER INFORMATION: protospacer sequence

```
<400> SEQUENCE: 27
cgaaaggttt tgcactcgac                                                    20

<210> SEQ ID NO 28
<211> LENGTH: 36
<212> TYPE: DNA
<213> ORGANISM: Homo sapiens

<400> SEQUENCE: 28
aagtccttcc agcagcagca gcagcagcag cagcag                                  36
```

APPLICATIONS OF RECOMBINED SCCAS9 ENZYMES FOR PAM-FREE DNA MODIFICATION

RELATED APPLICATIONS

This application claims the benefit of U.S. Provisional Application Ser. No. 63/210,967, filed Jun. 15, 2021, the entire disclosure of which is herein incorporated by reference.

This application is also a continuation-in-part of U.S. patent application Ser. No. 16/689,071, filed Nov. 19, 2019, which claims the benefit of U.S. Provisional Application Ser. No. 62/769,520, filed Nov. 19, 2018, and is a continuation-in-part of U.S. patent application Ser. No. 16/136,238, filed Sep. 19, 2018, which claims the benefit of U.S. Provisional Application Ser. No. 62/560,630, filed Sep. 19, 2017, the entire disclosures of which are all herein incorporated by reference.

This application contains a Sequence Listing in.txt format submitted under the provisions of 37 CFR 1.831 (a) and herein incorporated by reference. The Sequence Listing includes, in.txt format, the following file: File name Creation Date Size in bytes MIT1210_seq_list ST25.txt Jun. 9, 2025 6:12PM 30000

FIELD OF THE TECHNOLOGY

The present invention relates to genome editing and, in particular, to PAM-free genome editing with an optimized chimeric *Streptococcus canis* Cas9, along with variants and uses thereof.

BACKGROUND

CRISPR enzymes currently employed require a specified protospacer adjacent motif (PAM) flanking a guide RNA-programmed target site, limiting their sequence accessibility for robust genome editing applications.

The RNA-guided DNA endonucleases (RGENs) of the CRISPR-Cas system, such as Cas9 [M. Jinek, K. Chylinski, I. Fonfara, M. Hauer, J. A. Doudna, et al., "A programmable dual-RNA-guided DNA endonuclease in adaptive bacterial immunity", Science 337, 816-821 (2012)] and Cas12a [B. Zetsche, J. S. Gootenberg, O. O. Abudayyeh, I. M. Slaymaker, K. S. Makarova, et al., "Cpf1 is a Single RNA-Guided Endonuclease of a Class 2 CRISPR-Cas System", Cell 163, 759-771 (2015)], have proven to be versatile tools for genome editing and regulation [Sander, J. D. & Joung, J. K., "CRISPR-Cas systems for editing, regulating and targeting genomes", Nature Biotechnology 32, 347-355 (2014); Doudna, J. A. & Charpentier, "E. Genome editing. The new frontier of genome engineering with CRISPR-Cas9", Science 346, 1258096 (2014)].

The range of targetable sequences is limited, however, by the need for a specific protospacer adjacent motif (PAM), which is determined by DNA-protein interactions, to immediately follow the DNA sequence specified by a guide RNA (gRNA) [Mojica, F. J., et al., "Short motif sequences determine the targets of the prokaryotic CRISPR defense system", Microbiology 155, 733-740 (2009); Shah, S. A., et al., "Protospacer recognition motifs: mixed identities and functional diversity", RNA Biology 10, 891-899 (2013); Jinek, M. et al., "A programmable dual-RNA-guided DNA endonuclease in adaptive bacterial immunity", Science 337, 816-821 (2012); Sternberg, S. H., et al., "DNA interrogation by the CRISPR RNA-guided endonuclease Cas9", Nature 507, 62-67 (2014); Zetsche, B., et al., "Cpf1 is a Single RNA-Guided Endonuclease of a Class 2 CRISPR-Cas System", Cell 163:3, 759-771 (2015)].

In particular, in order to conduct programmable genome editing, CRISPR-associated (Cas) endonucleases require that a protospacer adjacent motif (PAM) immediately follows the target DNA sequence specified by the single guide RNA (sgRNA) [Jinek, M. et al., "A programmable dual-RNA-guided DNA endonuclease in adaptive bacterial immunity", Science 337, 816-821 (2012); Mojica, F. J., et al., "Short motif sequences determine the targets of the prokaryotic CRISPR defense system", Microbiology 155, 733-740 (2009); Shah, S. A., et al., "Protospacer recognition motifs: mixed identities and functional diversity", RNA Biology 10, 891-899 (2013)]. PAM binding then triggers DNA strand separation, thereby enabling base pairing between the sgRNA and the target DNA strand for subsequent nucleolytic cleavage and editing events [Sternberg, S. H., et al., "DNA interrogation by the CRISPR RNA-guided endonuclease Cas9", Nature 507, 62-67 (2014); Gong, S., Yu, H. H., Johnson, K. A. & Taylor, D. W., "DNA unwinding is the primary determinant of CRISPR-Cas9 activity", Cell Reports 22, 359-371 (2018)]. For example, the most widely-used variant, *Streptococcus pyogenes* Cas9 (SpCas9), requires a minimal, guanine (G)-rich 5'-NGG-3' PAM [Jinek, M. et al., "A programmable dual-RNA-guided DNA endonuclease in adaptive bacterial immunity", Science 337, 816-821 (2012); Anders, C. & Jinek, M., "In vitro enzymology of Cas9", Methods in Enzymology 546, 1-20 (2014); Anders, C., Bargsten, K. & Jinek, M., "Structural plasticity of PAM recognition by engineered variants of the RNA-guided endonuclease Cas9,", Molecular Cell 61, 895-902 (2016)] motif downstream of its RNA-programmed DNA target [Jinek, M. et al., "A programmable dual-RNA-guided DNA endonuclease in adaptive bacterial immunity", Science 337, 816-821 (2012)].

In applications that require targeting a precise position along DNA, the current sequence limitation imposed by the small set of known PAM motifs has constrained the impact of synthetic genome engineering efforts [Mojica, F. J., et al., "Short motif sequences determine the targets of the prokaryotic CRISPR defense system", Microbiology 155, 733-740 (2009); Jinek, M. et al., "A programmable dual-RNA-guided DNA endonuclease in adaptive bacterial immunity", Science 337, 816-821 (2012); Zetsche, B., et al., "Cpf1 is a Single RNA-Guided Endonuclease of a Class 2 CRISPR-Cas System", Cell 163:3, 759-771 (2015)]. This problem imposes severe accessibility constraints for therapeutically-relevant editing applications requiring precise genomic positioning, such as base editing [Komor, A. C., Kim, Y. B., Packer, M. S., Zuris, J. A. & Liu, D. R., "Programmable editing of a target base in genomic DNA without double-stranded dna cleavage", Nature 533, 420-424 (2016); Gaudelli, N. M. et al., "Programmable base editing of A-T to G-C in genomic DNA without DNA cleavage", Nature 551, 464-471 (2017)] and homology-directed repair [Cong, L. et al.' "Multiplex genome engineering using CRISPR/Cas systems", Science 339, 819-823 (2013); Mali, P. et al., "RNA-guided human genome engineering via Cas9", Science 339, 823-826 (2013); Jinek, M. et al., "RNA-programmed genome editing in human cells", eLife 2 (2013)].

To relax this constraint, additional Cas9 and Cas12a variants with distinct PAM motif requirements have been discovered in nature or engineered to diversify the space of targetable DNA sequences. Bioinformatics tools have been utilized to align Clustered Regularly Interspaced Short Palindromic Repeats (CRISPR) cassettes of numerous bacterial species with presumed protospacers in phage or other genomes. This mapping helps to infer and subsequently test PAM sequences of naturally occurring orthologs that possess useful properties, such as decreased size [Ran, F. A. et al., "In vivo genome editing using *Staphylococcus aureus* Cas9", Nature 520, 186-191 (2015); Kim, E. et al., "In vivo genome editing with a small Cas9 orthologue derived from *Campylobacter jejuni*", Nature Communications 8, 14500 (2017)] and thermostability [Harrington, L. et al., "A thermostable Cas9 with increased lifetime in human plasma", bioRxiv (2017)]. However, such analysis does not guarantee efficient activity, and must be followed by assays to validate PAMs.

Alternatively, functionally efficient RGENs, such as SpCas9 and *Acidaminococcus* sp. Cas12a (AsCas12a), have been utilized as scaffolds for engineering to produce variants with altered PAM specificities [Kleinstiver, B. P. et al., "Engineered CRISPR-Cas9 nucleases with altered specificities", Nature 523, 481-485 (2015); Gao, L., et al., "Engineered Cpf1 variants with altered specificities", Nature Biotechnology 35, 789-792 (2017)], with measured success.

Recent engineering and discovery efforts have yielded a host of other Cas9 variants with altered or relaxed PAM sequences [e.g. Kleinstiver, B. P. et al., "Broadening the targeting range of staphylococcus aureus CRISPR-cas9 by modifying PAM recognition", Nature Biotechnology 33, 1293-1298 (2015); Edraki, A. et al., "A compact, high-accuracy Cas9 with a dinucleotide PAM for in vivo genome editing", Molecular Cell 73, 714-726.e4 (2019); Gasiunas, G. et al., "A catalogue of biochemically diverse CRISPR-Cas9 orthologs", Nature Communications 11 (2020); Nishimasu, H. et al., "Engineered CRISPR-Cas9 nuclease with expanded targeting space", Science (New York, N.Y.) 361 (2018); Hu, J. H. et al., "Evolved Cas9 variants with broad PAM compatibility and high DNA specificity", Nature 556, 57-63 (2018); Ma, D. et al., "Engineer chimeric Cas9 to expand PAM recognition based on evolutionary information", Nature Communications 10, 560 (2019)].

Recently, *Streptococcus pyogenes* Cas9 (SpCas9) has been engineered to have a minimal 5'-NRN-3' PAM specificity, via directed evolution and rational mutagenesis [Hu, J., et al., "Evolved Cas9 variants with broad PAM compatibility and high DNA specificity", Nature 556, 57-63 (2018); Nishimasu, H., et al., "Engineered CRISPR-Cas9 nuclease with expanded targeting space", Science, eaas9129 (2018)].

Concurrently, to expand the targetable sequence space of CRISPR, an optimized Cas9, Sc++, which is a variant of *Streptococcus canis* ScCas9 that employs a positive-charged loop that relaxes the base requirement at the second PAM position was generated, thus enabling a 5'-NNG-3' preference, rather than the canonical 5'-NGG-3' [Chatterjee, P., et al., "Minimal PAM specificity of a highly similar SpCas9 ortholog", Science Advances, 4, 10, eaau0766 (2018); Chatterjee, P. et al., "An engineered ScCas9 with broad PAM range and high specificity and activity", Nature Biotechnology 38, 1154-1158 (2020)]. Sc++ has simultaneously broad targeting capability (5'-NNG-3' PAM), high on-targeted editing efficiency, and low off-targeting propensity. Sc++, and its precursor, ScCas9, both utilize an N-terminal insertion, loop-like motif that interacts with the PAM backbone and eliminates specific base requirements at the second position of the PAM sequence.

Concurrent with the development of Sc++, Walton, et al. have engineered a near-PAMless Cas9, termed SpRY, which contains mutations in the PAM-interacting domain (PID) of SpCas9 that enable strong 5'-NRN-3' specificity, alongside weaker 5'-NYN-3' targeting [Walton, R. T., Christie, K. A., Whittaker, M. N. & Kleinstiver, B. P., "Unconstrained genome targeting with near-PAMless engineered CRISPR-Cas9 variants", Science (2020)]. Both Sc++ and SpRY thus represent exciting advances in CRISPR-based genome editing due to their robust editing characteristics and unprecedented genomic accessibility, respectively [Tang, L., "PAM-less is more", Nature Methods 17, 559-559 (2020)].

SUMMARY

The present invention is an addition to the family of CRISPR-Cas9 systems repurposed for genome engineering and regulation applications. Specifically, the invention comprises the usage of the PAM-interacting domain of the engineered SpRY Cas9 grafted onto the homologous N-terminal domain of Sc++ or ScCas9 enzymes (herein referred to as SpRYc), in complex with guide RNA to enable specific recognition and activity on a DNA target immediately upstream, regardless of the downstream PAM sequence, promoting new flexibility in target selection.

In the present invention, the PAM-interacting domain of SpRY, a broad-targeting Cas9 possessing a 5'-NRN-3' PAM, is recombined with the N-terminus of Sc++, a Cas9 with simultaneously broad, efficient, and accurate editing capabilities, to generate an enzyme with no distinct PAM preference: SpRYc. It is demonstrated that SpRYc leverages structural properties of both enzymes to be highly active and accurate on diverse 5'-NNN-3' PAM sequences and disease-related loci for potential therapeutic applications.

In one aspect, the invention is an isolated, engineered *Streptococcus canis* Cas9++ (Sc++) protein, modified at its C-terminus with the PAM-interacting domain of an engineered *Streptococcus pyogenes* (SpRY) Cas9 protein. In one embodiment, the protein comprises residues 1-1119 of Sc++ followed by residues 1111-1368 of SpRY.

In another aspect, the invention is an engineered chimeric CRISPR-associated DNA endonuclease with 5'-NNN-3' PAM preference comprising an isolated, engineered *Streptococcus canis* Cas9++ (Sc++) protein modified at the C-terminus with a PAM-interacting domain of an engineered *Streptococcus pyogenes* (SpRY) Cas9 protein. In one embodiment, the endonuclease comprises residues 1-1119 of Sc++ followed by residues 1111-1368 of SpRY.

In a further aspect, the invention is a method of altering expression of at least one gene product comprising steps of introducing, into a eukaryotic cell containing and expressing a DNA molecule having a target sequence and encoding the gene product, an engineered, non-naturally occurring Clustered Regularly Interspaced Short Palindromic Repeats (CRISPR)-CRISPR associated (Cas) (CRISPR-Cas) system comprising one or more vectors comprising (a) a regulatory element operable in a eukaryotic cell operably linked to at least one nucleotide sequence encoding a CRISPR system guide RNA that hybridizes with the target sequence, and (b) a second regulatory element operable in a eukaryotic cell operably linked to a nucleotide sequence encoding an isolated, engineered *Streptococcus canis* Cas9++ (Sc++) protein modified at the C-terminus of said Sc++ with a PAM-interacting domain of an engineered *Streptococcus pyogenes* (SpRY) Cas9 protein, wherein components (a) and (b) are located on same or different vectors of the system, whereby the guide RNA targets the target sequence, and the Sc++ protein modified with the PAM-interacting domain of an engineered *Streptococcus pyogenes* (SpRY) Cas9 cleaves the DNA molecule, whereby expression of the at least one gene product is altered, and wherein the protein and the guide RNA do not naturally occur together. In one embodiment, the isolated engineered Sc++ protein comprises residues 1-1119 of Sc++ followed by residues 1111-1368 of SpRY.

BRIEF DESCRIPTION OF THE DRAWINGS

Other aspects, advantages and novel features of the invention will become more apparent from the following detailed description of the invention when considered in conjunction with the accompanying drawings, wherein:

FIGS. 2A-D illustrate engineering of SpRYc, wherein FIG. 2A depicts interaction of the engineered Sc++ loop with the backbone of the target strand (TS) PAM region, FIG. 2B depicts potential interaction of residue R1331 with the non-target strand (NTS) backbone, FIG. 2C shows that multiple mutations within the PAM interaction loop allow for a more exible PAM readout, and FIG. 2D illustrates that the potential van der Waals interaction of W1145 with the ribose moieties of non-target strand residues could further stabilize the PAM interaction.

DETAILED DESCRIPTION

Figure 1:
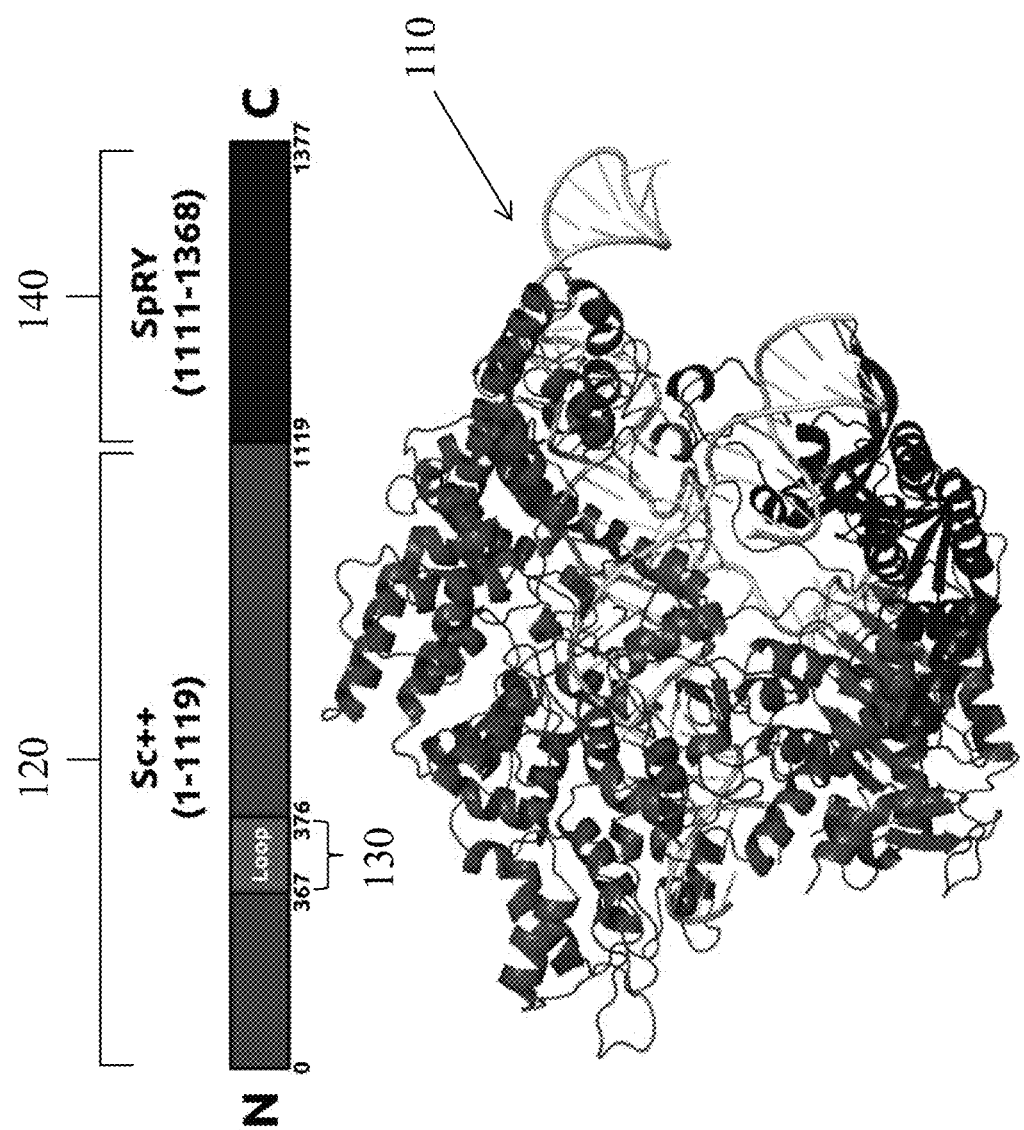
FIG. 1 depicts a homology model and 3-D visualization of SpRYc, according to one embodiment of the invention.

The present invention includes genome engineering applications of a grafted ScCas9++-SpRY chimeric Cas9 and its engineered variants, possessing minimal 5'-NNN-3' PAM specificity. Overall, SpRYc consists of the N-terminus (residues 1-1119) of Sc++, including the flexible loop, followed by the region of SpRY (residues 1111-1368) spanning its PID mutations.

ScCas9, the precursor of ScCas9++ ("Sc++"), is a closely related ortholog of SpCas9 that possesses 5'-NNG-3' PAM specificity. The substitution mutations conferring the 5'-NR-3' specificity of SpRY all reside within the PAM-interacting domain (PID). Due to the amino acid homology of Sc++ and SpRY, the PID of SpRY (residues 1111-1368) can be grafted onto the N-terminal domain of Sc++ (from residues 1-1119) to generate a chimeric SpRYc enzyme. Exploiting the N-terminal homology of ScCas9 in combination with the PID of SpRY enables a further relaxation to an 5'-NNN-3' PAM.

In the present invention, Sc++ (Table 1) and SpRY, described in Walton, R. T., Christie, K. A., Whittaker, M. N. & Kleinstiver, B. P., "Unconstrained genome targeting with near-PAMless engineered CRISPR-Cas9 variants", Science (2020) [NIH NLM Accession: PRJNA605711, ID: 605711], which is herein incorporated by reference, are combined to engineer a fully-optimized Cas9 enzyme that can induce edits with no discernible PAM requirement. To do this, computational modeling and experimental enzyme engineering were employed to graft the PID of SpRY to the C-terminus of Sc++, generating the chimeric SpRYcCas9 (herein referred to as SpRYc). SpRYc integrates the loop structure of Sc++ and the PID mutations of SpRY to obtain 5'-NNN-3' PAM preference, efficient editing capability in human cells, and reduced off-targeting propensity for diverse genome editing applications, including the targeting and editing of disease-related loci.

TABLE 1

| ScCas9++ (Sc++) [SEQ ID NO: 1] | | | | | | |
|---|---|---|---|---|---|---|
| MEKKYSIGLD | IGTNSVGWAV | ITDDYKVPSK | KFKVLGNTNR | KSIKKNLMGA | LLFDSGETAE | 60 |
| ATRLKRTARR | RYTRRKNRIR | YLQEIFANEM | AKLDDSFFQR | LEESFLVEED | KKNERHPIFG | 120 |
| NLADEVAYHR | nyptiyhlrk | KLADSPEKAD | LRLIYLALAH | IIKFRGHFLI | EGKLNAENSD | 180 |
| VAKLFYQLIQ | TYNQLFEESP | LDEIEVDAKG | ILSARLSKSK | RLEKLIAVFP | NEKKNGLFGN | 240 |
| 11ALALGLTP | NFKSNFDLTE | DAKLQLSKDT | YDDDLDELLG | QIGDQYADLF | SAAKNLSDAI | 300 |
| LLSDILRSNS | EVTKAPLSAS | MVKRYDEHHQ | DLALLKTLVR | QQFPEKYAEI | FKDDTKNGYA | 360 |
| GYVGADKKLR | KRSGKLATEE | EFYKFIKPIL | EKMDGAEELL | AKLNRDDLRR | KQRTFDNGSI | 420 |
| PHQIHLKELH | AILRRQEEFY | PFLKENREKI | EKILTFRIPY | YVGPLARGNS | RFAWLTRKSE | 480 |

TABLE 1-continued

ScCas9++ (Sc++) [SEQ ID NO: 1]

| | | | | | | |
|---|---|---|---|---|---|---|
| EAITPWNFEE | WDKGASAQS | FIERMTNFDE | QLPNKKVLPK | HSLLYEYFTV | YNELTKVKYV | 540 |
| TERMRKPEFL | SGEQKKAIVD | LLFKTNRKVT | VKQLKEDYFK | KIECFDSVEI | IGVEDRFNAS | 600 |
| LGTYHDLLKI | IKDKDFLDNE | ENEDILEDIV | LTLTLFEDRE | MIEERLKTYA | HLFDDKVMKQ | 660 |
| LKRRHYTGWG | RLSRKMINGI | RDKQSGKTIL | DFLKSDGFSN | RNFMQLIHDD | SLTFKEEIEK | 720 |
| AQVSGQGDSL | HEQIADLAGS | PAIKKGILQT | VKIVDELVKV | MGHKPENIVI | EMARENQTTT | 780 |
| KGLQQSRERK | KRIEEGIKEL | ESQILKENPV | ENTQLQNEKL | YLYYLQNGRD | MYVDQELDIN | 840 |
| RLSDYDVDHI | VPQSFIKDDS | IDNKVLTRSV | ENRGKSDNVP | SEEVVKKMKN | YWRQLLNAKL | 900 |
| ITQRKFDNLT | KAERGGLSEA | DKAGFIKRQL | VETRQITKHV | ARILDSRMNT | KRDKNDKPIR | 960 |
| EVKVITLKSK | LVSDFRKDFQ | LYKVRDINNY | HHAHDAYLNA | WGTALIKKY | PKLESEFVYG | 1020 |
| DYKVYDVRKM | IAKSEQEIGK | ATAKRFFYSN | IMNFFKTEVK | LANGEIRKRP | LIETNGETGE | 1080 |
| VVWNKEKDFA | TVRKVLAMPQ | VNIVKKTEVQ | TGGFSKESIL | SKRESAKLIP | RKKGWDTRKY | 1140 |
| GGFGSPTVAY | SILWAKVEK | GKAKKLKSVK | VLVGITIMEK | GSYEKDPIGF | LEAKGYKDIK | 1200 |
| KELIFKLPKY | SLFELENGRR | RMLASAKELQ | KANELVLPQH | LVRLLYYTON | ISATTGSNNL | 1260 |
| GYIEQHREEF | KEIFEKIIDF | SEKYILKNKV | NSNLKSSFDE | QFAVSDSILL | SNSFVSLLKY | 1320 |
| TSFGASGGFT | FLDLDVKQGR | LRYQTVTEVL | DATLIYQSIT | GLYETRTDLS | QLGGD | 1375 |

Engineering of SpRYc

SpRY harbors ten substitutions in the PID of SpCas9 (L1111R, D1135L, S1136W, G1218K, E1219Q, A1322R, R1333P, R1335Q, and T1337R) which help reduce its specificity from the canonical 5'-NGG-3' to the more exible 5'-NRN-3' PAM [Walton, R. T., Christie, K. A., Whittaker, M. N. & Kleinstiver, B. P., "Unconstrained genome targeting with near-PAMless engineered CRISPR-Cas9 variants", Science (2020)]. Alternatively, ScCas9 and Sc++ both employ positive-charged, exible loop-like structures in their N-terminus (residues 367 to 376) that do not exist in SpCas9 or SpRY, and relax the need for the second PAM base, enabling more minimal 5'-NNG-3' PAM preference rather than 5'-NGG-3' [Chatterjee, P., et al., "Minimal PAM specificity of a highly similar SpCas9 ortholog", Science Advances, 4, 10, eaau0766 (2018); Chatterjee, P. et al., "An engineered ScCas9 with broad PAM range and high specificity and activity", Nature Biotechnology 38, 1154-1158 (2020)].

Previously, the GC-independent PID of *Streptococcus macacae* Cas9 was grafted to the N-terminus of its ortholog, SpCas9, to generate iSpyMac, an efficient 5'-NAA-3' editor [Chatterjee, P. et al., "A Cas9 with PAM recognition for adenine dinucleotides", Nature Communications 11 (2020)]. Motivated by previous domain grafting results, a single variant possessing the critical properties of SpRY and Sc++ was engineered by rationally exchanging the PID of Sc++ with that of SpRY to generate a chimeric hybrid Cas9: SpRYc. SpRYc consists of the N-terminus (residues 1-1119) of Sc++, including the exible loop, followed by the region of SpRY (residues 1111-1368) spanning its PID mutations.

FIG. 1 depicts a Homology model of SpRYc generated in SWISS-MODEL from PDB 4UN3 and visualized 110 in PyMol. Seen in FIG. 1 are N-terminus residues 1-1119 of Sc++ 120, including loop 130, spanning residues 367-376, followed by residues 1111-1368 of SpRY at residues 1119-1377 of SpRYc. In the color visualization 110, PAM is indicated in yellow, the loop in purple, Sc++ N-terminus in red, and SpRY PID in blue.

In Silico Modeling of SpRYc

It was hypothesized that the optimized loop of Sc++ may improve the targeting breadth and efficiency of SpRY by generating sequence-nonspecific interactions with the PAM to relax the need for an A or G at position 2. Owing to the nearly 90% sequence similarity between ScCas9 and SpCas9, homology modeling of SpRYc in the DNA substrate bound-state was conducted using the SWISS-MODEL server [Waterhouse, A. et al., "SWISS-MODEL: homology modelling of protein structures and complexes", Nucleic Acids Research 46, W296-W303 (2018)].

Figure 2A:
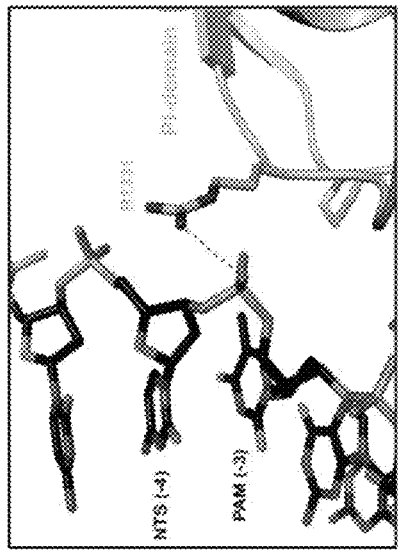
Figure 2B:
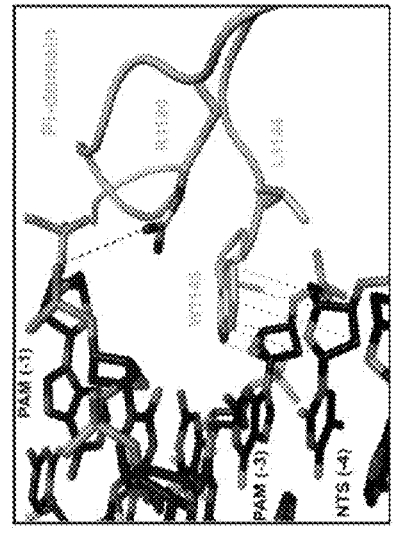
Figure 2C:
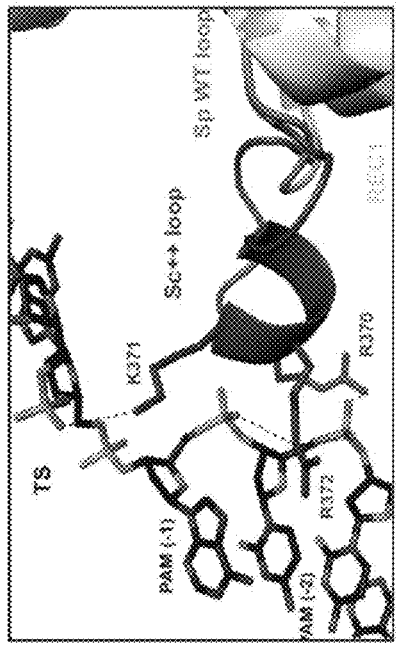
Figure 2D:
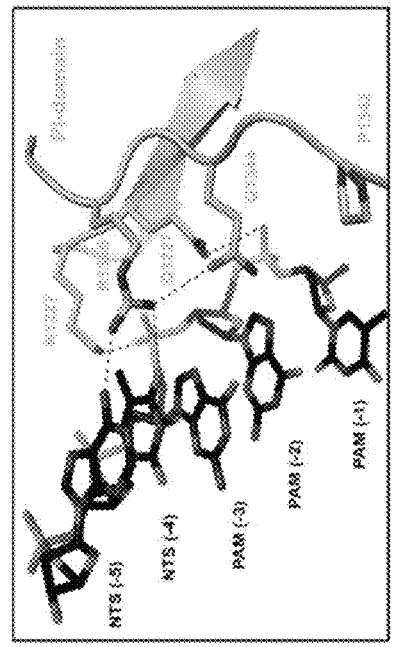

FIGS. 2A-D illustrate engineering of SpRYc. FIG. 2A depicts interaction of the engineered Sc++ loop (purple) with the backbone of the target strand (TS) PAM region. The REC1 loop from wild type SpCas9 is indicated in green. FIG. 2B depicts potential interaction of residue R1331 with the non-target strand (NTS) backbone. FIG. 2C shows that multiple mutations within the PAM interaction loop allow for a more exible PAM readout. FIG. 2D illustrates that the potential van der Waals interaction of W1145 with the ribose moieties of non-target strand residues could further stabilize the PAM interaction.

Simulations indicate that the engineered positive-charged loop inserted into the REC1 domain points towards the PAM region of the target DNA strands and establishes new interactions with the phosphate backbone of the target strand (FIG. 2A). In addition, the combination of ScCas9 and SpRY mutations results in several new non-specific backbone interactions with the non-target strand, thereby suggesting a relaxed PAM selectivity of SpRYc (FIGS. 2B, 2C). Of note is a putative van der Waals interaction of the aromatic side chain of W1145 with the ribose moieties of the proximal non-target strand residues FIG. 2D) [Wilson, K. A., Kellie, J. L. & Wetmore, S. D., "DNA-protein—interactions in nature: abundance, structure, composition and strength of contacts between aromatic amino acids and DNA nucleobases or deoxyribose sugar", Nucleic Acids Research 42, 6726-6741 (2014)]. The new interactions resulting from the engineered mutations may thus energetically compensate for lack of PAM-specific recognition and facilitate local unwinding of double stranded DNA necessary for efficient R-loop formation in the absence of canonical PAM interactions.

PAM Characterization of SpRYc

To validate the predicted PAM flexibility of the described variants, a bacterial assay based upon lad promoter repression of GFP expression, employing a fully randomized 8-nucleotide library of PAM sequences upstream of lad, was utilized [Leenay, R. T. et al., "Identifying and visualizing functional PAM diversity across CRISPR-Cas systems", Mol. Cell 62, 137-147 (2016)]. The library-containing plasmids were co-electroporated with a gRNA plasmid and a nuclease-activity deficient SpRYc (dSpRYc) plasmid, all expressing different antibiotic resistance cassettes (Kanamycin, Ampicillin, Chloramphenicol, respectively). Transformants were collected in 5 ml of triple antibiotic-containing Luria Broth (LB) media. Overnight cultures were diluted to an ABS600 of 0.01 and cultured to an OD600 of 0.2. Cultures were analyzed and sorted on a FACSAria machine (Becton Dickinson). Events were gated based on forward scatter and side scatter and fluorescence was measured in the FITC channel (488 nm laser for excitation, 530/30 filter for detection), with at least 30,000 gated events for data analysis. Sorted GFP-positive cells were grown to sufficient density, and plasmids from the pre-sorted and sorted populations were then isolated, and the region flanking the nucleotide library was PCR amplified and submitted for Sanger sequencing (Genewiz). The sequencing chromatograms demonstrate no specific PAM preference of SpRYc, as compared to the 5'-NGG-3' PAM of SpCas9 and the more restrictive PAM of SpRY.

Figure 3:
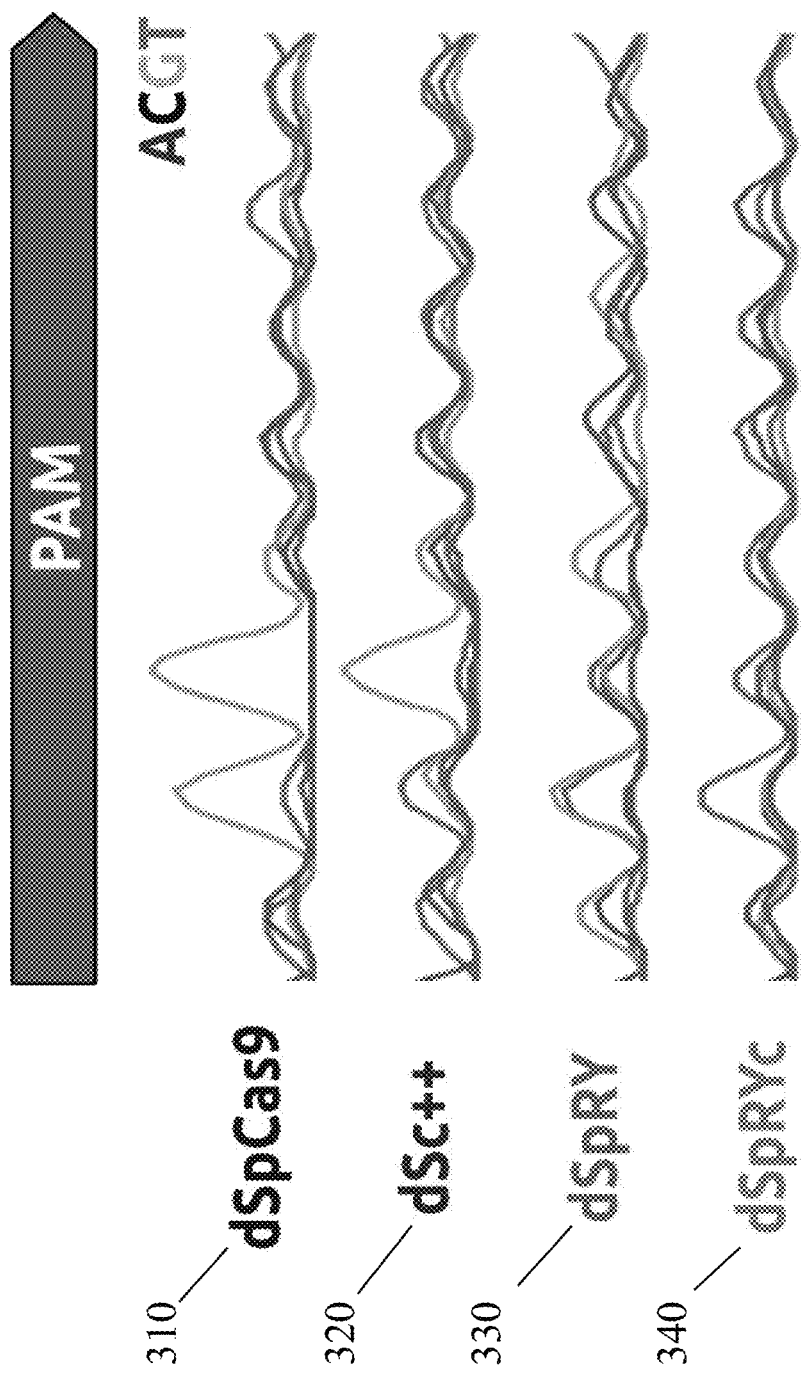
FIG. 3 depicts PAM enrichment for indicated dCas9 enzymes utilizing PAM-SCALAR, according to one aspect of the invention.

FIG. 3 depicts PAM enrichment for dCas9 enzymes dSpCas9 310, dSc++ 320, dSpRY 330, and dSpRYc 340, utilizing PAM-SCALAR. Each dCas9 plasmid was electroporated in duplicates, subjected to FACS analysis, and gated for GFP expression based on a negative \No Cas9" control and a positive dSpCas9 control. All samples were performed in independent transformation duplicates (n=2), and the PAMs of the GFP-positive cells were sequenced via Sanger sequencing.

Figure 4:
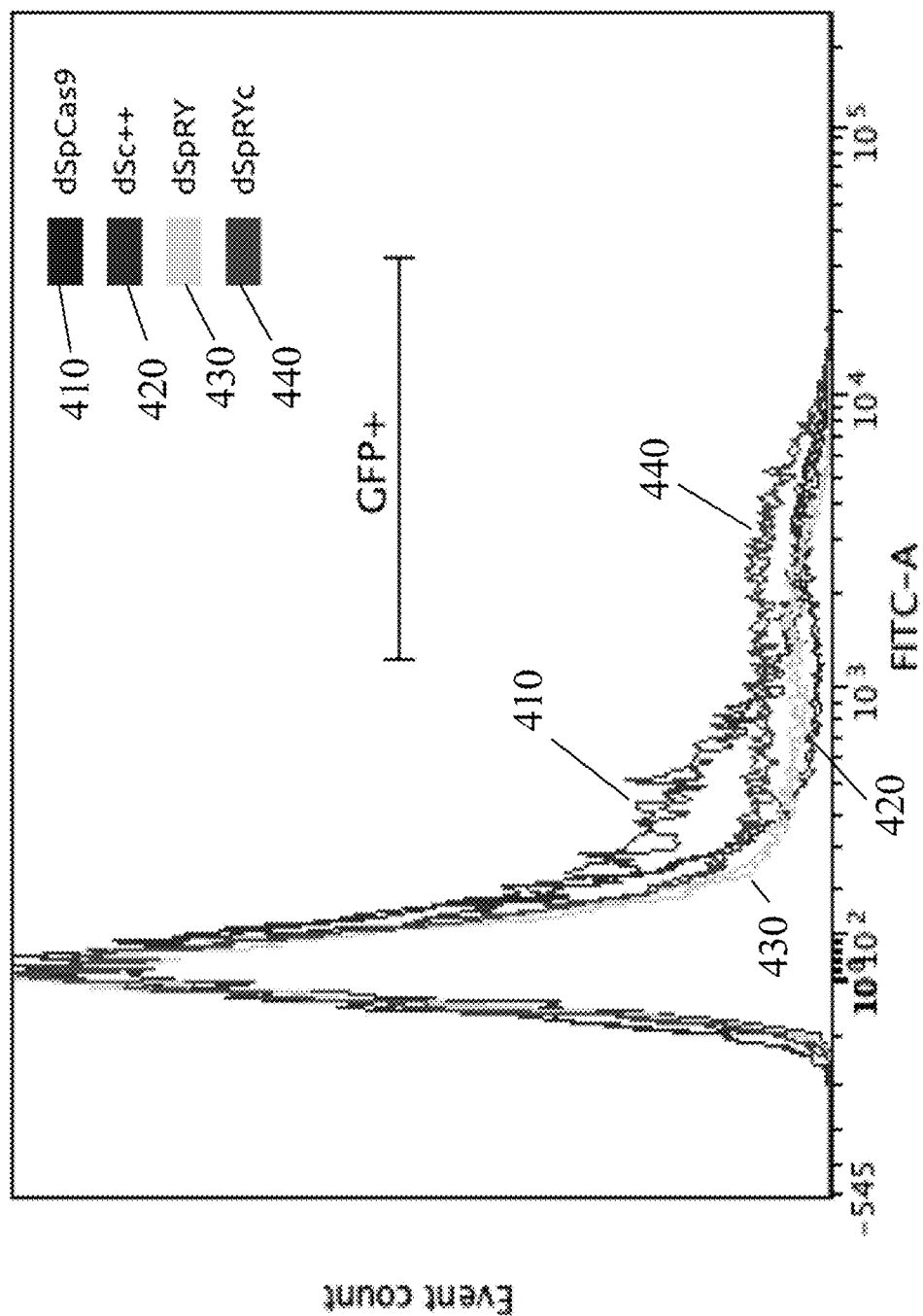
FIG. 4 is a graph illustrating an embodiment of a gating strategy for PAM-SCANR FACS analysis.

To experimentally validate the relaxed PAM specificity of SpRYc in comparison to SpCas9, Sc++, and SpRY, a positive selection bacterial screen based on green fluorescent protein (GFP) expression conditioned on PAM binding was utilized, termed PAM-SCALAR [Leenay, R. T. et al., "Identifying and visualizing functional PAM diversity across CRISPR-Cas systems", Mol. Cell 62, 137-147 (2016)]. Following transformation of the PAM-SCALAR plasmid, harboring a fully randomized 5'-NNNNNNNN-3' (8N) PAM library, an sgRNA plasmid targeting the fixed PAM-SCANR protospacer, and a corresponding dCas9 plasmid, FACS analysis was conducted to isolate GFP-positive cells in each population for subsequent library amplification and sequencing (FIG. 4). The results demonstrate that while SpRY preferentially binds to an A or G at position 2 in the PAM, as expected, SpRYc does not bias against any specific base at any PAM position, further supporting the structural analyses (FIG. 3).

FIG. 4 is a graph illustrating gating strategy for PAM-SCALAR FACS analysis. 10,000 gated events for data analysis based on default FSC/SSC parameters for E. coli. The GFP+ gate was established both by a "no dCas9" negative control and a "dSpCas9" positive control. Shown in FIG. 4 are dSpCas9 410, dSc++ 420, dSpRY 430, and dSpRYc 440

Human Genome Editing Capabilities of SpRYc

The present invention further includes the application of SpRYc variants as tools for genome engineering in human cells. Briefly, the coding sequence of the described Cas9 variants are transiently transfected, using standard lipofection reagents (e.g. Lipofectamine 2000) in HEK293T cells along with guide RNA vectors under the control of a U6 promoter containing spacer sequences targeting various 5'-NNN-3' PAM sequences at the various genomic locus. After 5 days post transfection, individual cells are harvested for genomic extraction to allow for an approximately one kilobase (kb) window around the target to be amplified via polymerase chain reaction (PCR).

Figure 5:
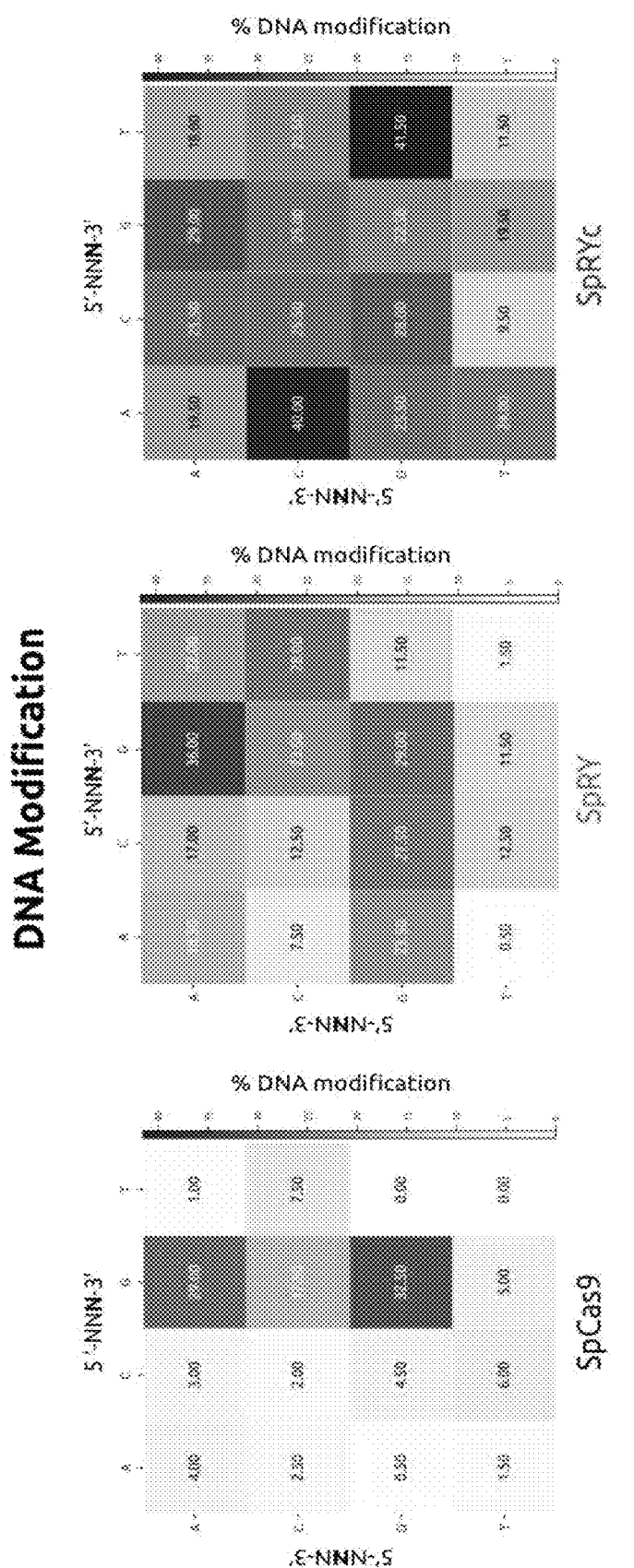
FIG. 5 depicts the results of quantitative analysis of indel formation with indicated Cas9 variants.
Figure 6:
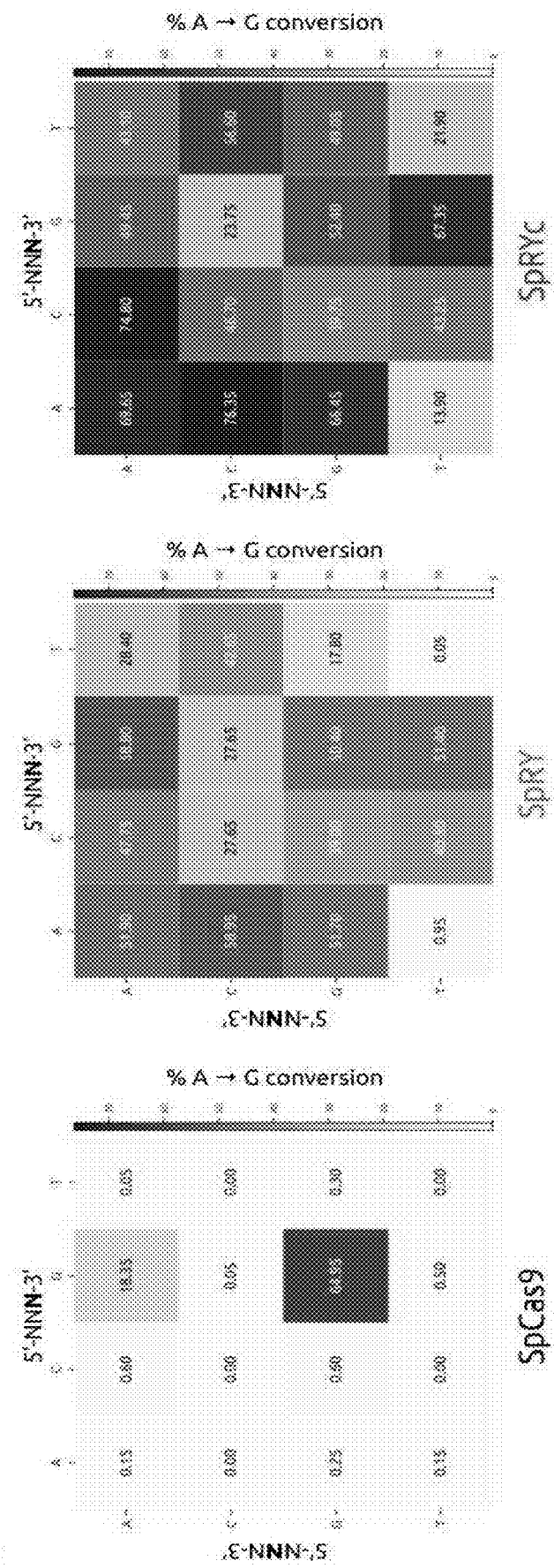
FIG. 6 depicts the results of quantitative analysis of A-to-G Base Editing with indicated ABE8e variants.

FIGS. 5 and 6 illustrate the broad, efficient, and specific genome editing capabilities of SpRYc. FIG. 5 depicts quantitative analysis of indel formation with indicated Cas9 variants. Indel frequencies were determined via batch analysis following PCR amplification of indicated genomic loci, in comparison to unedited controls for each gene target. All samples were performed in independent transfection duplicates (n=2) and the mean of the quantified indel formation values was calculated.

FIG. 6 depicts quantitative analysis of A-to-G Base Editing with indicated ABE8e variants. Base editing conversion rates were determined via BEEP following PCR amplification of indicated genomic loci, in comparison to unedited controls for each gene target. All samples were performed in independent transfection duplicates (n=2) and the mean of the quantified base editing formation values was calculated.

Indel (FIG. 5) and base editing (FIG. 6) analysis demonstrates effective modification on 5'-NNN-3' targets with a variety of base combinations at positions 1 and 4 in the PAM sequence. Indel formation can be further verified on Sanger sequencing results utilizing the TIDE algorithm or ICE (Synthego). The invention further consists of utilizing the described variants for applications such as, but not limited to, specific base conversions, and gene regulation applications, such as transcriptional activation and repression.

Figure 14:
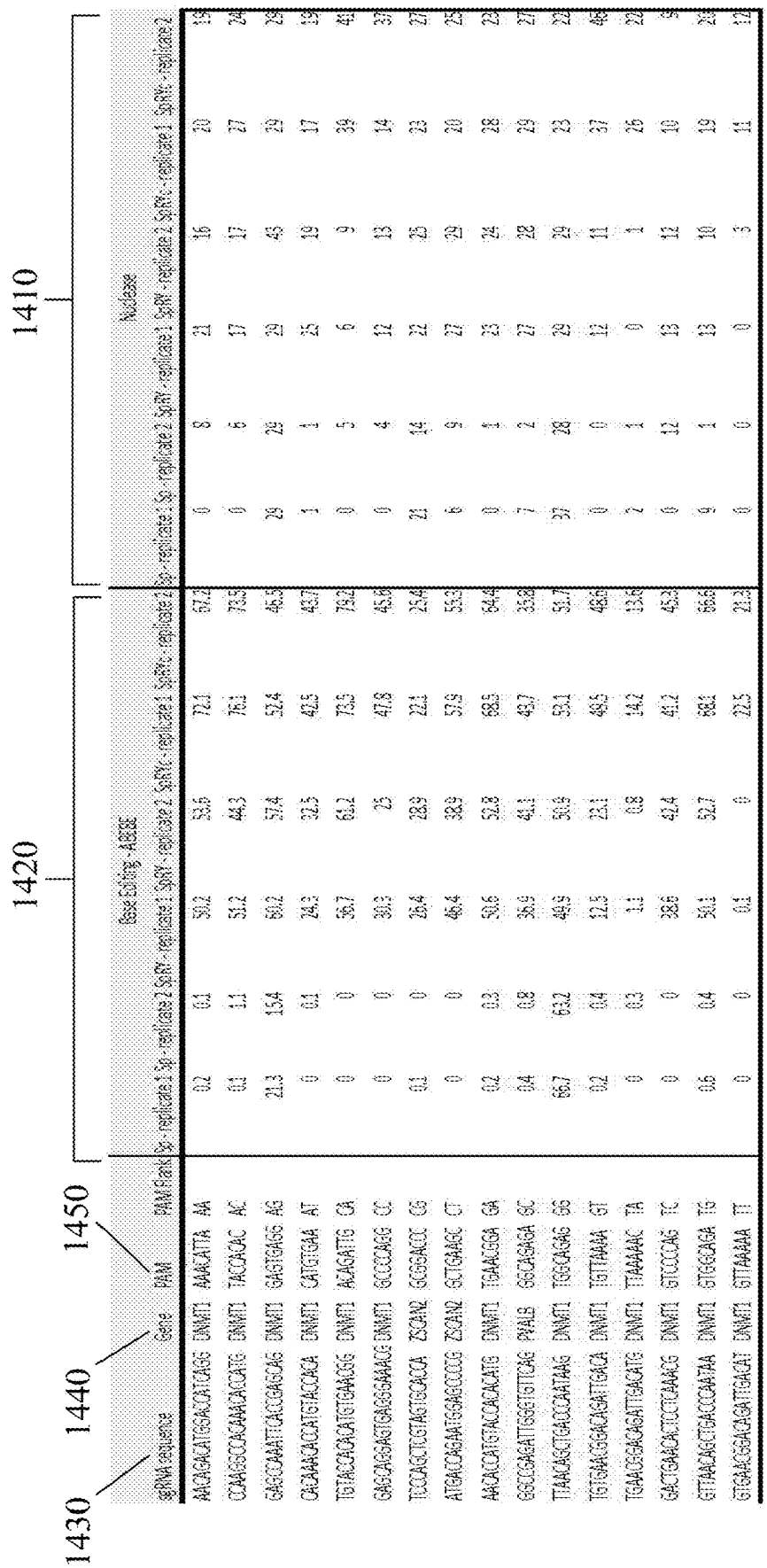
FIG. 14 is a table presenting the curated dataset of indel and base editing efficiencies at each site by target sequence, genomic locus, and PAM, for an experiment comparing the PAM specificities and DNA cleavage capabilities of SpRYc to SpCas9 and SpRY, according to one implementation of the invention.

The PAM specificities and DNA cleavage capabilities of SpRYc were compared to SpCas9 and SpRY by transfecting HEK293T cells with plasmids expressing each Cas9 alongside one of sixteen sgRNAs which were directed to various genomic loci representing every two-base PAM combination (5'-NNN-3'). FIG. 14 presents the curated dataset of indel 1410 and base editing 1420 efficiencies at each site by target sequence 1430, genomic locus 1440, and PAM 1450. Table 2 lists relevant DNA and protein sequences related to the experiment (Table 2).

TABLE 2

| Construct | Protein Sequence |
|---|---|
| SpRYc [SEQ ID NO: 2] | MEKKYSIGLDIGTNSVGWAVITDDYKVPSKKFKVLGNTNRKSIK KNLMGALLFDSGETAEATRLKRTARRRYTRRKNRIRYLQEIFANE MAKLDDSFFQRLEESFLVEEDKKNERHPIFGNLADEVAYHRNYP TIYHLRKKLADSPEKADLRLIYLALAHIIKFRGHFLIEGKLNAENS DVAKLFYQLIQTYNQLFEESPLDEIEVDAKGILSARLSKSKRLEKL |

TABLE 2-continued

IAVFPNEKKNGLFGNIIALALGLTPNFKSNFDLTEDAKLQLSKDTY
DDDLDELLGQIGDQYADLFSAAKNLSDAILLSDILRSNSEVTKAP
LSASMVKRYDEHHQDLALLKTLVRQQFPEKYAEIFKDDTKNGY
AGYVGADKKLRKRSGKLATEEEFYKFIKPILEKMDGAEELLAKL
NRDDLLRKQRTFDNGSIPHQIHLKELHAILRRQEEFYPFLKENREK
IEKILTFRIPYYVGPLARGNSRFAWLTRKSEEAITPWNFEEVVDKG
ASAQSFIERMTNFDEQLPNKKVLPKHSLLYEYFTVYNELTKVKY
VTERMRKPEFLSGEQKKAIVDLLFKTNRKVTVKQLKEDYFKKIE
CFDSVEIIGVEDRFNASLGTYHDLLKIIKDKDFLDNEENEDILEDIV
LTLTLFEDREMIEERLKTYAHLFDDKVMKQLKRRHYTGWGRLSR
KMINGIRDKQSGKTILDFLKSDGFSNRNFMQLIHDDSLTFKEEIEK
AQVSGQGDSLHEQIADLAGSPAIKKGILQTVKIVDELVKVMGHK
PENIVIEMARENQTTTKGLQQSRERKKRIEEGIKELESQILKENPV
ENTQLQNEKLYLYYLQNGRDMYVDQELDINRLSDYDVDHIVPQS
FIKDDSIDNKVLTRSVENRGKSDNVPSEEVVKKMKNYWRQLLNA
KLITQRKFDNLTKAERGGLSEADKAGFIKRQLVETRQITKHVARI
LDSRMNTKRDKNDKPIREVKVITLKSKLVSDFRKDFQLYKVRDIN
NYHHAHDAYLNAVVGTALIKKYPKLESEFVYGDYKVYDVRKMI
AKSEQEIGKATAKRFFYSNIMNFFKTEVKLANGEIRKRPLIETNGE
TGEVVWNKEKDFATVRKVLAMPQVNIVKKTEVQTGGFSKESIRP
KRNSDKLIARKKDWDPKKYGGFLWPTVAYSVLVVAKVEKGKSK
KLKSVKELLGITIMERSSFEKNPIDFLEAKGYKEVKKDLIIKLPKYS
LFELENGRKRMLASAKQLQKGNELALPSKYVNFLYLASHYEKLK
GSPEDNEQKQLFVEQHKHYLDEIIEQISEFSKRVILADANLDKVLS
AYNKHRDKPIREQAENIIHLFTLTRLGAPRAFKYFDTTIDPKQYRS
TKEVLDATLIHQSITGLYETRIDLSQLGGD

| Gene/Construct | Forward Primer | Reverse Primer |
| --- | --- | --- |
| PAM-SCANR Library | AGATCCTTGGCGGCAAGAAA [SEQ ID NO: 3] | CGCGGGAAACGGTCTGATAA [SEQ ID NO: 4] |
| DNMT1 | CCAGAATGCACAAAGTACTGCAC [SEQ ID NO: 5] | GCCAAAGCCCGAGAGAGTGCC [SEQ ID NO: 6] |
| PVALB | CTGGAAAGCCAATGCCTGAC [SEQ ID NO: 7] | GGCAGCAAACTCCTTGTCCT [SEQ ID NO: 8] |
| ZSCAN2 | AGCCAGAGCTCCAGTCTGAT [SEQ ID NO: 9] | CGGGACTTGACTCAGACCAC [SEQ ID NO: 10] |
| RTT PB Locus | TTATGACTAGTGGATCCCCCG [SEQ ID NO: 11] | GGGACTTTCCACACCGTCAA [SEQ ID NO: 12] |
| HTT | CCGCTCAGGTTCTGCTTTTA [SEQ ID NO: 13] | GGCTGAGGCAGCAGCGGCTG [SEQ ID NO: 14] |

| Synthetic Locus | DNA Sequence |
| --- | --- |
| PiggyBac_RTT [SEQ ID NO: 15] | ACCCATGTATGATGACCCCACCCTGCCTGAAGGCTGGACATGG AAGCTTAAGCAAAGGAAATCTGGCCGCTCTGCTGGGAAGTAT GATGTTTGTTCCTTGTGTCTTTCTGTTTGTCCCCACAAGTCCCC AGGGAAAAGCCTTTTGCTCTAAAGTGGAGTTGATTGCGTACTT CGAAAAGGTAGGCGACACATCCCTGGACCCTAATGATTTTGAC TTCATGGTAACTGGGAGAGGGAGCCCCTCCCGGTGAGAGCAG AAACCACCTAAGAAGCCCAAATCTCCCAAGCTCCAGGAACTG GCAGAGGCCGGGACGCCCCAAAGGGAGCGGCACCACGAGA CCCAAGGCGGCCACGTCAGAGGGTGTGCAGGTGAAAAGGGTC CTGGAGAAAAGTCCTGGGAAGCTCCTTGTCAAGATGCCTTTTC AAACTFCGCCAGGGGGCAAGGCTGAGGGGGGTGGGGCCACCA CATCCACCCAGGTCATGGTGATCAAACGCCCCGGCAGGAAGT GAAAAGCTGAGGCCGACCCTCAGGCCATTCCCAAGAAACGGG GCTGAAAGCCGGGGATGTGGTGGCAGCCGCTGCCGCCGAGGC CAAAAAGAAAGCCGTGAAGAGTCTTCTATCTGATCTGTGCAG GAGACCGTACTCCCCATCAAGAAGTCAAGACCCGGGAGACGG TCAG CATCGAGGTCAAGGAA |

TABLE 2-continued

| sgRNA | crRNA Sequence | PAM |
|---|---|---|
| HTT sgRNA | GCTGCTGCTGCTGCTGCTGG [SEQ ID NO: 16] | AAGGACTT |
| RTT_C316T | AGCTTCCATGTCCAGCCTTC [SEQ ID NO: 17] | AGGCAGGG |
| RTT_C397T | AGAGCAAAAGGCTTTTCCCT [SEQ ID NO: 18] | GGGGACTT |
| RTT_C473T | ACCATGAAGTCAAAATCATT [SEQ ID NO: 19] | AGGGTCCA |
| RTT_C502T | TGCTCTCACCGGGAGGGGCT [SEQ ID NO: 20] | CCCTCTCC |
| RTT_C763T | TCACTTCCTGCCGGGCGTT [SEQ ID NO: 21] | TGATCACC |
| RTT_C808T | TCAGCCCCGTTTCTTGGGAA [SEQ ID NO: 22] | TGGCCTGA |
| RTT_C880T | TCAGATAGAAGACTCCTTCA [SEQ ID NO: 23] | CGGCTTTC |
| RTT_C916T | GCACTTCTTGATGGGAGTA [SEQ ID NO: 24] | CGGTCTCC |
| VEGFA_GuideSeq_sgRNA | GGTGAGTGAGTGTGTGCGTG [SEQ ID NO: 25] | TGGGGTTG |
| EMX1_GuideSeq_sgRNA | GAGTCCGAGCAGAAGAAGAA [SEQ ID NO: 26] | GGGCTCCC |

Five days after transfection, indel formation was quantified following PCR amplification of the target genomic regions and subsequent sequencing analysis. The results demonstrate that SpRYc generates indels at all tested genomic loci, compared to SpRY, which possesses minimal activity on select 5'-NYN-3' PAM sequences (FIG. 5). The performance of SpRYc in comparison to SpCas9 and SpRY for base editing applications was similarly tested by fusing each variant to ABE8e, a rapid, high-activity adenine base editor [Richter, M. F. et al., "Phage-assisted evolution of an adenine base editor with improved Cas domain compatibility and activity", Nature Biotechnology 38, 883-891 (2020); Lapinaite, A. et al., "DNA capture by a CRISPR-Cas9-guided adenine base editor", Science 369, 566-571 (2020)]. The editing efficiency of the base with the highest conversion percentage in the editing window was quantified by utilizing the Base Editing Evaluation Program (BEEP) following PCR amplification of the target genomic regions [Chatterjee, P., et al., "Minimal PAM specificity of a highly similar SpCas9 ortholog", Science Advances, 4, 10, eaau0766 (2018)]. The results reveal that SpRYc-ABE8e can efficiently base edit at all tested genomic sequences, as compared to SpCas9-ABE8e and the slightly more restrictive SpRY-ABE8e (FIG. 6). Taken together, the results suggest that SpRYc is able to target, cleave, and base edit at genomic sites with minimal dependence on a specific PAM sequence.

To integrate the editing data into a single representation, thresholded bit scores were generated, which calculates the number of bits of bias in the PAM domain of each enzyme normalized by SpCas9's activity on the canonical 5'-NGG-3' PAM as a baseline. For example, a Cas9 with a bit score of 4.0 has a definitive two-base PAM, while a Cas9 with a bit score of 0 suggests a fully PAMless Cas9. From the data, SpCas9 exhibits a bit score of 2.7 and 3.6 for DNA modification and base editing, respectively, while SpRY's bit scores of 0.9 and 0.7 demonstrates its near-PAMless editing capability. SpRYc has minimal bit scores of 0.2 and 0.3 for DNA modification and base editing, thus suggesting an even broader PAM targeting profile.

Tables 3-6 present bit score calculations for each enzyme tested, conducted on DNA modification and A-to-G base editing data. Table 2 presents a summary of results, Table 3 presents results for SpCas9, Table 4 presents results for SpRY, and Table 5 presents results for SpRYc.

TABLE 3

(Summary)

|  | Raw Bit Score | Threshold Bit Score |
|---|---|---|
| DNA Modification |  |  |
| SpCas9 | 3.1 | 2.7 |
| SpRY | 1.8 | 0.9 |
| SpRYc | 1.0 | 0.2 |
| A-> G Base Editing |  |  |
| SpCas9 | 3.7 | 3.6 |
| SpRY | 1.7 | 0.7 |
| SpRYc | 0.9 | 0.3 |

TABLE 4

(SpCas9)

| | DNA Modification | | | |
|---|---|---|---|---|
| | 4 | 3 | 29 | 1 |
| | 2.5 | 2 | 17.5 | 7.5 |
| | 0.5 | 4.5 | 32.5 | 0 |
| | 1.5 | 6 | 5 | 0 |
| Raw Normalized Sum | 3.58 | | | |
| Thresholded Normalized Sum | 5.31 | | | |
| Raw Bit Score | 3.1 | | | |
| Raw 'Base' PAM | 1.55 | | | |
| Threshld Bit Score | 2.67 | | | |
| Threshld 'Base' PAM | 1.34 | | | |
| Normalization Factor | 32.5 | | | |
| M | 2 | | | |
| | A-> G Base Editing | | | |
| | 0.15 | 0.6 | 18.35 | 0.05 |
| | 0 | 0 | 0.05 | 0 |
| | 0.25 | 0.6 | 64.95 | 0.3 |
| | 0.15 | 0 | 0.5 | 0 |
| Raw Normalized Sum | 1.32 | | | |
| Thresholded Normalized Sum | 1.65 | | | |
| Raw Bit Score | 3.7 | | | |

TABLE 4-continued (SpCas9)

| | |
|---|---|
| Raw 'Base' PAM | 1.83 |
| Threshld Bit Score | 3.59 |
| Threshld 'Base' PAM | 1.79 |
| Normalization Factor | 64.95 |
| M | 2 |

TABLE 5

(SpRY)

| DNA Modification | | | |
|---|---|---|---|
| 18.5 | 17 | 36 | 22 |
| 7.5 | 12.5 | 23.5 | 28 |
| 23.5 | 27.5 | 29 | 11.5 |
| 0.5 | 12.5 | 11.5 | 1.5 |
| Raw Normalized Sum | 8.69 | | |
| Thresholded Normalized Sum | 12.54 | | |
| Raw Bit Score | 1.8 | | |
| Raw 'Base' PAM | 0.91 | | |
| Threshld Bit Score | 0.87 | | |
| Threshld 'Base' PAM | 0.43 | | |
| Normalization Factor | 32.5 | | |

| A-> G Base Editing | | | |
|---|---|---|---|
| 51.9 | 47.75 | 58.8 | 28.4 |
| 58.95 | 27.65 | 27.65 | 42.65 |
| 51.7 | 39 | 50.4 | 17.8 |
| 0.95 | 40.5 | 51.4 | 0.05 |
| Raw Normalized Sum | 9.17 | | |
| Thresholded Normalized Sum | 13.16 | | |
| Raw Bit Score | 1.7 | | |
| Raw 'Base' PAM | 0.85 | | |
| Threshld Bit Score | 0.71 | | |
| Threshld 'Base' PAM | 0.36 | | |
| Normalization Factor | 64.95 | | |

TABLE 6

(SpRYc)

| DNA Modification | | | |
|---|---|---|---|
| 19.5 | 25.5 | 29 | 18 |
| 40 | 25.5 | 25 | 22.5 |
| 25.5 | 28 | 22.5 | 41.5 |
| 24 | 9.5 | 19.5 | 11.5 |
| Raw Normalized Sum | 11.91 | | |
| Thresholded Normalized Sum | 15.29 | | |
| Raw Bit Score | 1.0 | | |
| Raw 'Base' PAM | 0.51 | | |
| Threshld Bit Score | 0.18 | | |
| Threshld 'Base' PAM | 0.09 | | |
| Normalization Factor | 32.5 | | |

| A-> G Base Editing | | | |
|---|---|---|---|
| 69.65 | 74.8 | 49.45 | 43.1 |
| 76.35 | 46.7 | 23.75 | 56.6 |
| 66.45 | 39.75 | 52.4 | 49.05 |
| 13.9 | 43.25 | 67.35 | 21.9 |
| Raw Normalized Sum | 12.23 | | |
| Thresholded Normalized Sum | 14.83 | | |
| Raw Bit Score | 0.9 | | |

TABLE 6-continued (SpRYc)

| | |
|---|---|
| Raw 'Base' PAM | 0.47 |
| Threshld Bit Score | 0.29 |
| Threshld 'Base' PAM | 0.15 |
| Normalization Factor | 64.95 |

Reduced Off-Target Propensity of SpRYc

Previously, it was demonstrated that Sc++ is an intrinsically high-fidelity enzyme, with far reduced off-targeting as compared to the standard SpCas9 [Chatterjee, P. et al., "An engineered ScCas9 with broad PAM range and high specificity and activity", Nature Biotechnology 38, 1154-1158 (2020)]. It was thus hypothesized that SpRYc may possess lower off-target propensity than its SpCas9-like counterpart, SpRY. To investigate this hypothesis, the genome-wide, unbiased GUIDE-Seq method [Tsai, S. Q. et al., "GUIDE-seq enables genome-wide profiling of off-target cleavage by CRISPR-Cas nucleases", Nature Biotechnology 33, 187-197 (2014)] was employed, by utilizing sgRNA sequences targeting two previously analyzed genomic loci (VEGFA and EMX1). The results demonstrate that compared to SpRY, SpRYc has nearly four-fold lower off-target activity with the VEGFA-targeting guide RNA, and two-fold lower activity when directed against the EMX1 site (FIG. 7, FIGS. 8A-B, FIGS. 9A-B). This data was corroborated via a mismatch tolerance assay [Chen, J. S. et al., "Enhanced proofreading governs CRISPR-Cas9 targeting accuracy", Nature 550, 407-410 (2017)], in which was employed sgRNAs harboring double or single mismatches to a fixed protospacer for an endogenous DNMT1 locus. SpRYc exhibited decreased activity on mismatched sequences, as compared to SpRY, with no detectable loss of on-target activity (FIG. 10).

Figure 7:
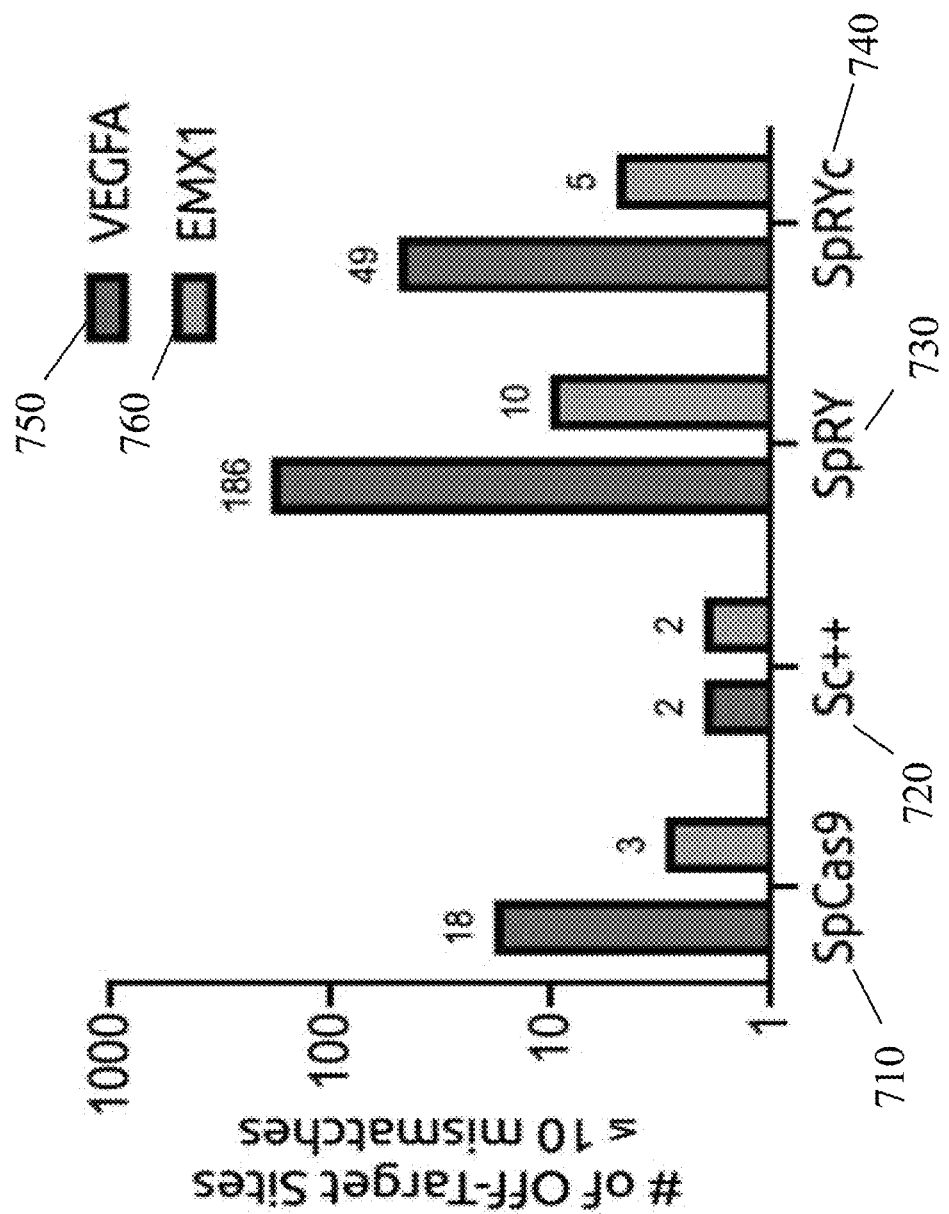
FIG. 7 is a graph of Off-targets as identified by GUIDE-seq genome-wide for SpCas9, Sc++, SpRY, and SpRYc, each paired with two sgRNAs targeting either EMX1 or VEGFA.

FIG. 7 is a graph of Off-targets as identified by GUIDE-seq genome-wide for SpCas9 710, Sc++ 720, SpRY 730, and SpRYc 740, each paired with two sgRNAs targeting either EMX1 750 or VEGFA 760. Only sites that harbored a sequence with <10 mismatches relative to the gRNA were considered potential off-target sites.

Figure 8A:
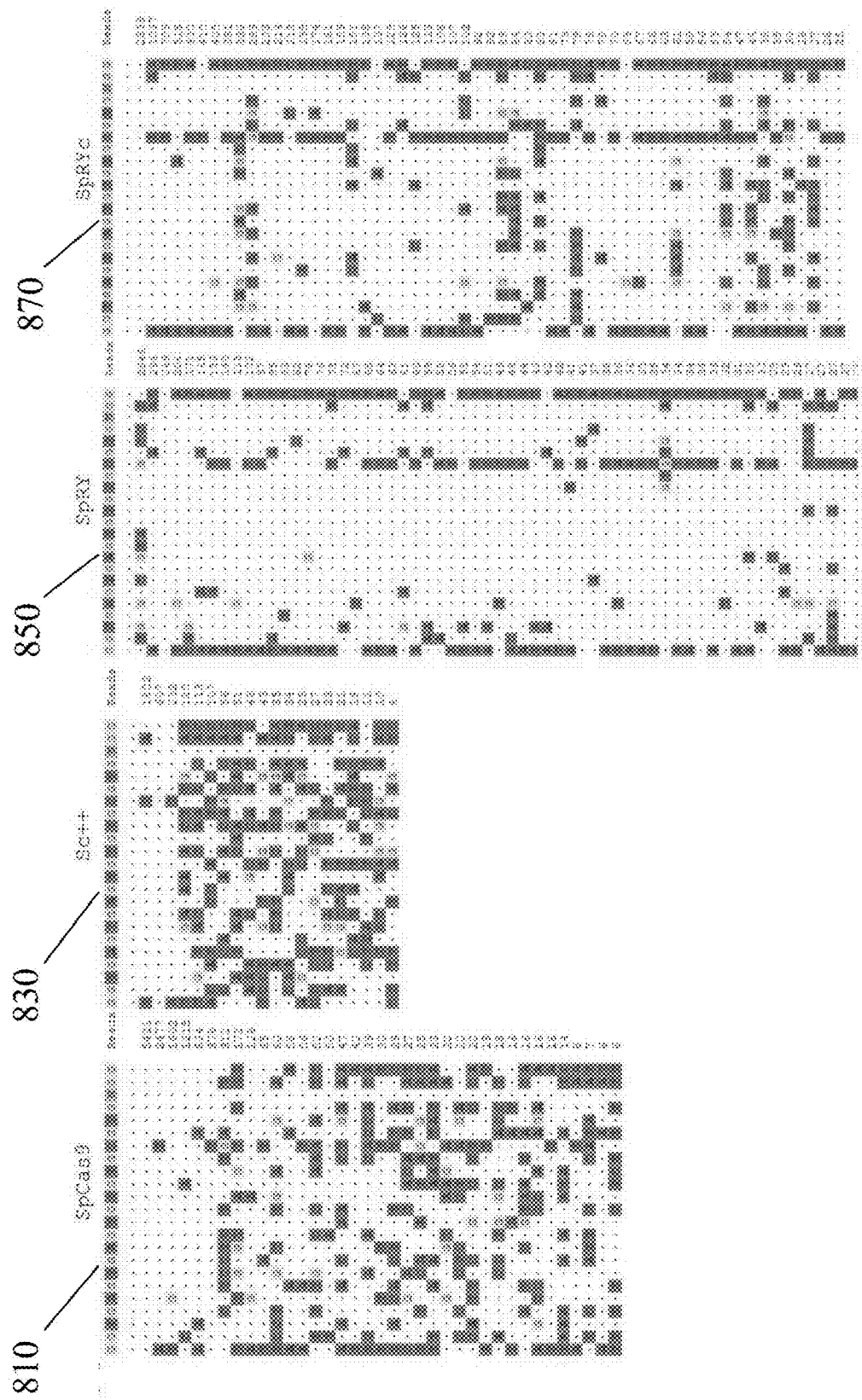
FIGS. 8A and 8B illustrate GUIDE-Seq data including counts at each detected off-target with ≤6 mismatches for each nuclease tested for the VEGFA site (FIG. 8A) and the EMX1 site (FIG. 8B).
Figure 8B:
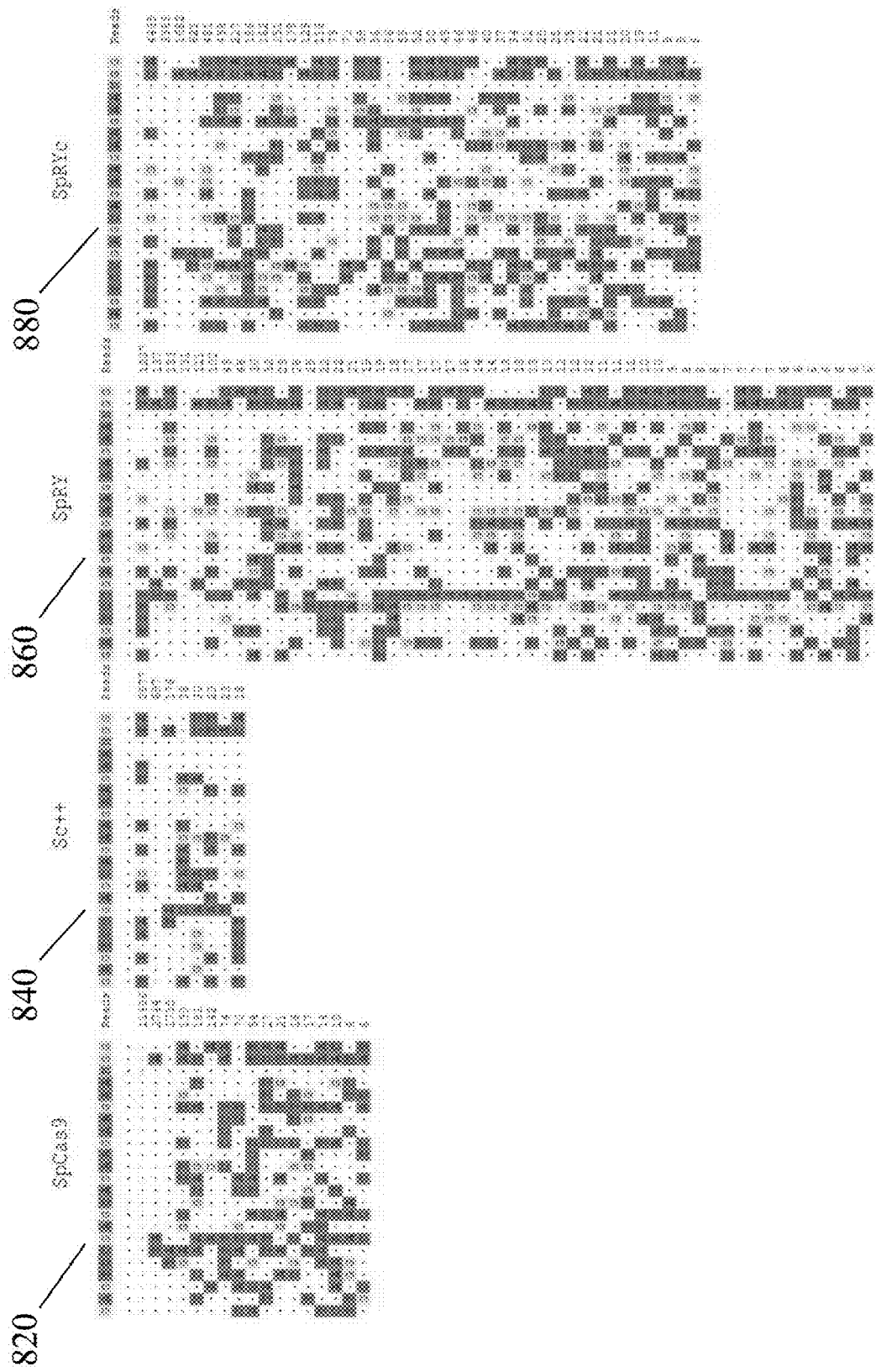

FIGS. 8A and 8B illustrate GUIDE-Seq data including counts at each detected off-target with ≤6 mismatches for each nuclease tested. For each Cas9, the on-target sequence is shown at the top with PAM in bold and with mismatches to the on-target site shown in color. GUIDE-Seq peak scores are shown to the right of each site. Data is shown for SpCas9 810, 820 Sc++ 830, 840, SpRY 850, 860, and SpRYc 870, 880 for the VEGFA site (FIG. 8A) and the EMX1 site (FIG. 8B).

Figure 9A:
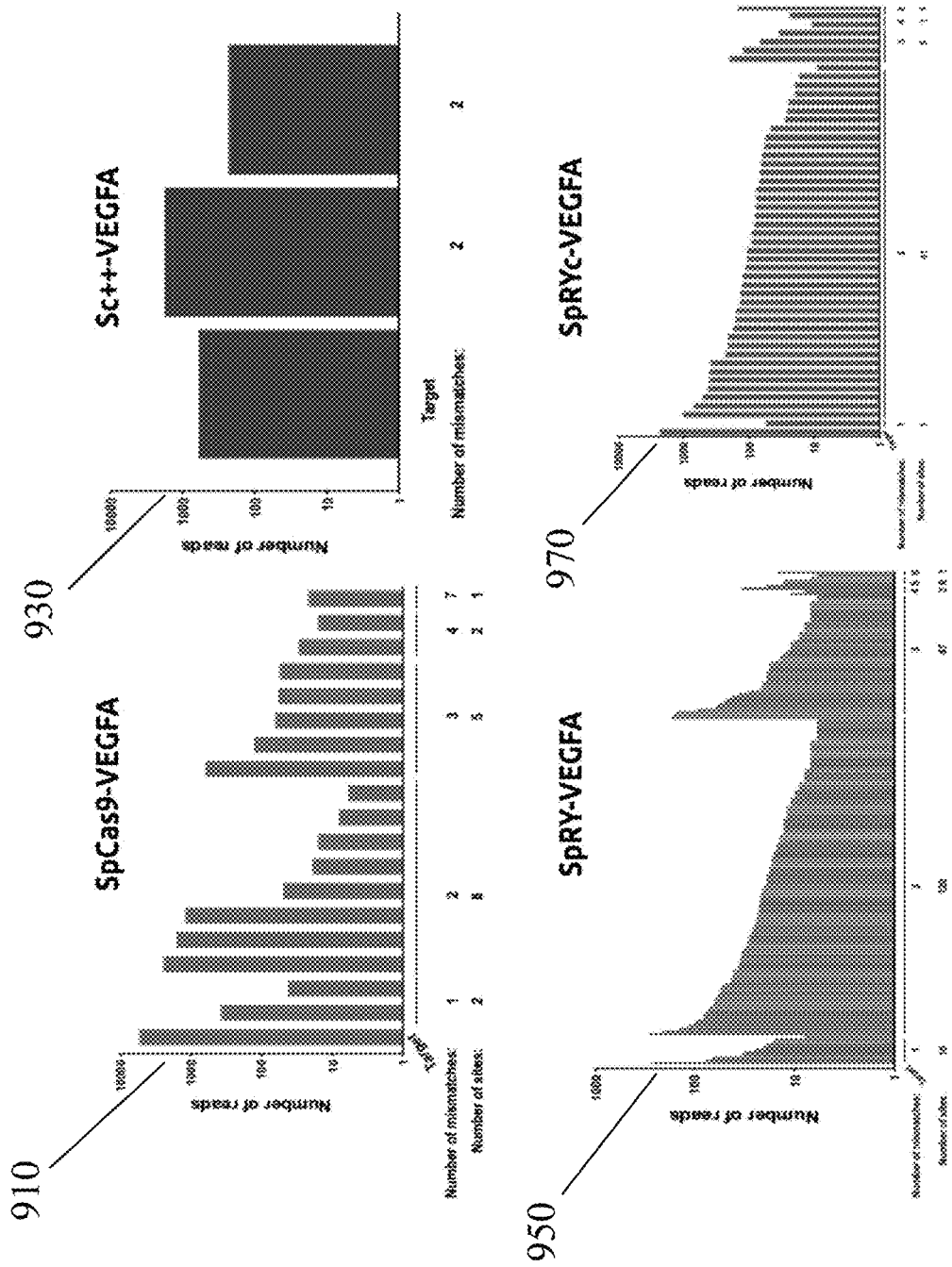
FIGS. 9A and 9B are graphs of GUIDE-Seq data for detected off-target read counts for each nuclease tested for target sites VEGFA (FIG. 9A) and EMX1 (FIG. 9B).
Figure 9B:
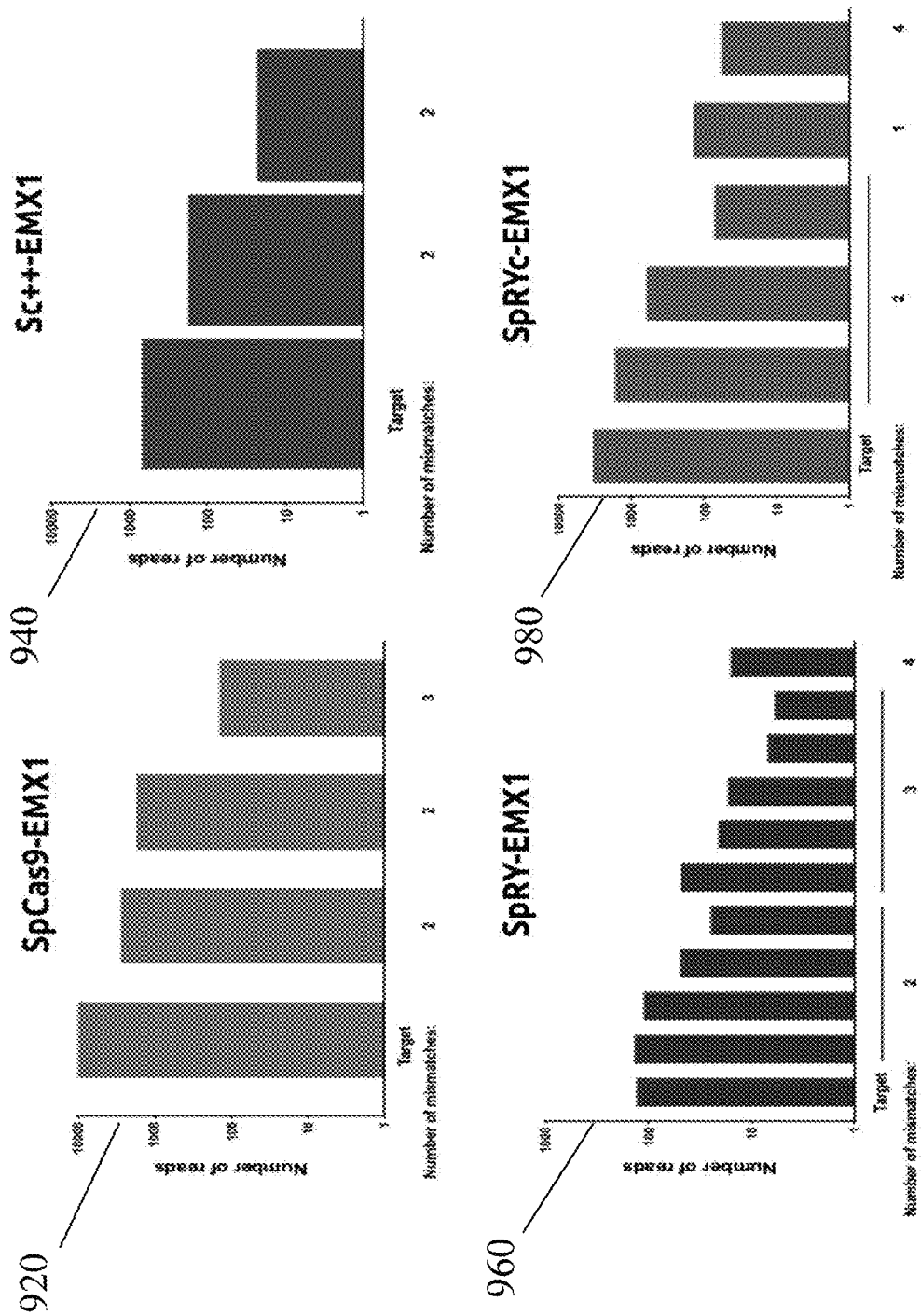
Figure 10:
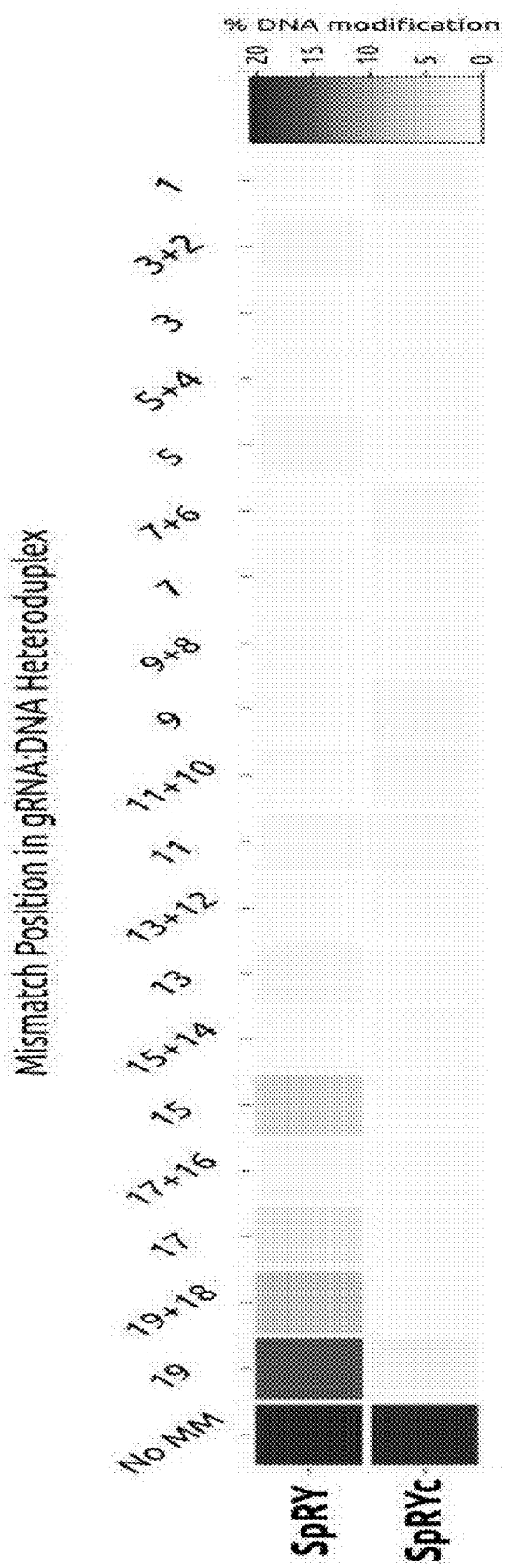
FIG. 10 is an efficiency heatmap of mismatch tolerance assays on genomic targets.

FIGS. 9A and 9B are graphs of GUIDE-Seq data for detected off-target read counts for each nuclease tested. Numbers of independent GUIDE-Seq reads for on- and off-target sites for all combinations of Cas9s (SpCas9 910, 920, Sc++ 930, 940, SpRY 950, 960, and SpRYc 970, 980) and target sites VEGFA (FIG. 9A) and EMX1 (FIG. 9B), binned by the number of mismatches (<6 mismatches) with the corresponding Cas9 and target site. The total number of sites in each bin are also shown.

FIG. 10 is an Efficiency heatmap of mismatch tolerance assay on genomic targets. Quantified indel frequencies are exhibited for each labeled single or double mismatch (number of bases 5' upstream of the PAM) in the sgRNA sequence for the indicated Cas9 variant and indicated PAM sequence. All samples were performed in independent transfection duplicates (n=2) and the mean of the quantified indel formation values was calculated.

SpRYc Base Editors Mediate Therapeutically-Relevant Edits

Having established SpRYc's broad, efficient, and accurate editing capabilities in human cells, its utility as a potential therapeutic modality for the treatment of genetic diseases was investigated. Rett syndrome (RTT) is a progressive neurological disorder that predominantly affects young females. A majority of patients carry one of eight mutations in the MECP2 gene (C316T, C397T, C473T, C502T, C763T, C808T, C880T, C916T), all of which are C-to-T substitution mutations and can thus be potentially ameliorated by CRISPR adenine base editors, such as ABE8e [Gaudelli, N. M. et al., "Programmable base editing of A-T to G-C in genomic DNA without DNA cleavage", Nature 551, 464-471 (2017); Richter, M. F. et al., "Phage-assisted evolution of an adenine base editor with improved Cas domain compatibility and activity", Nature Biotechnology 38, 883-891 (2020); Liyanage, V. R. B. & Rastegar, M., "Rett syndrome and MeCP2", NeuroMolecular Medicine 16, 231-264 (2014)]. Notably, one of the eight mutations, C502T, can only be accessed at target sites consisting of a 5'-NCN-3' or 5'-NTN-3' PAM, preventing its correction by previous adenine base editors. To test whether SpRYc-ABE8e can effectively edit at all eight sites, a universal RTT HEK293T cell line was generated via piggyBac transposase-mediated integration of a synthetic gene fragment encoding MECP2 installed with all eight of the aforementioned RTT mutations. After puromycin selection, the SpRYc-ABE8e plasmid was transfected alongside the appropriate sgRNAs for each site (Table 2 and FIG. 14). After subsequent DNA extraction, loci amplification, and sequencing, it was demonstrated that SpRYc-ABE8e can effectively edit all eight targets, including over 20% editing efficiency at the C502T mutation.

Figure 11:
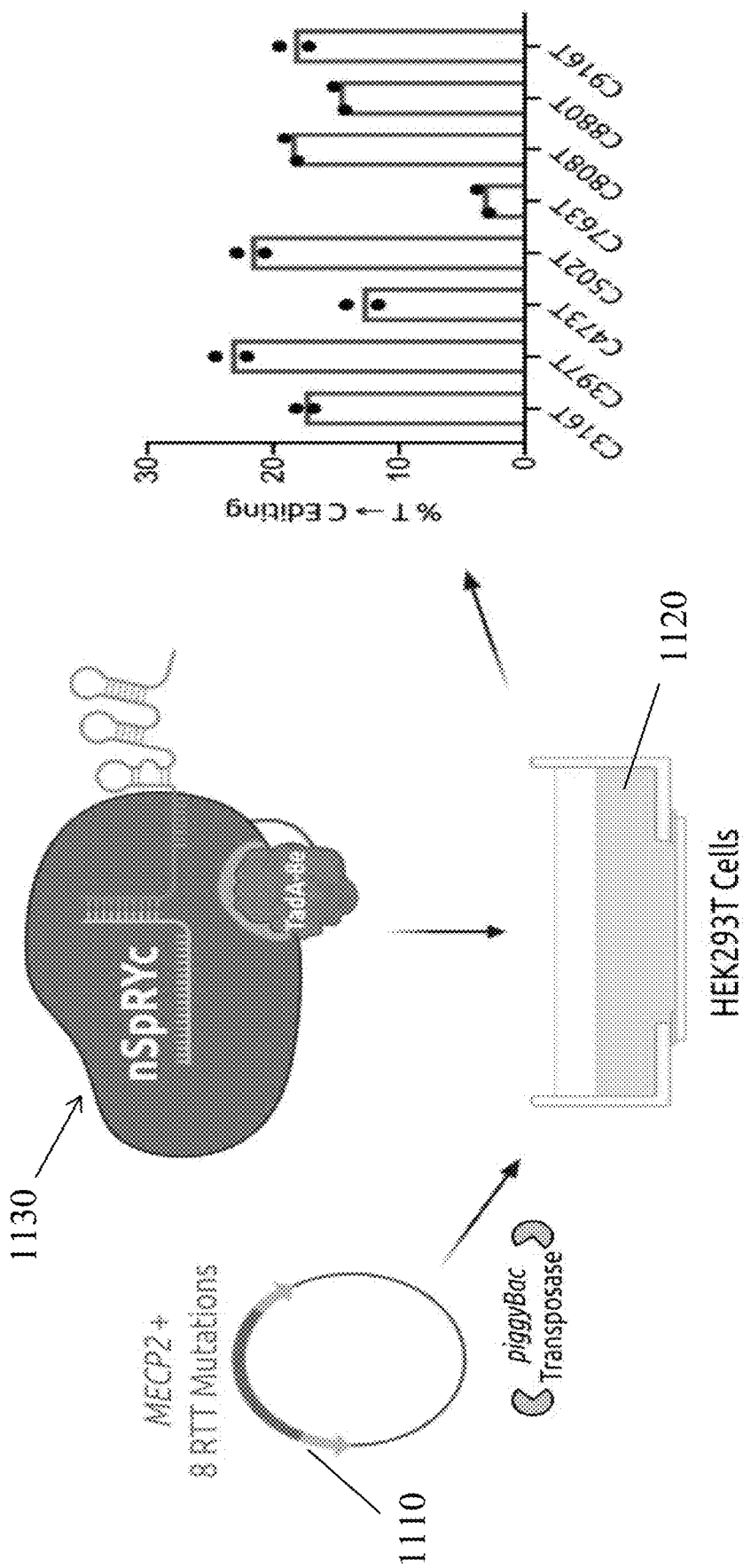
FIG. 11 is a schematic of an SpRYc RTT experiment, according to one aspect of the present invention.

As an example of targeting disease-associated loci with SpRYc, FIG. 11 is a schematic of an SpRYc RTT experiment. Briefly, a synthetic MECP2 gene fragment 1110 encoding eight specified RTT mutations was integrated into HEK293T cells 1120, followed by transfection of SpRYc-ABE8e 1130 and sgRNAs targeting each mutation. Base editing conversion rates were determined via BEEP following PCR amplification of indicated genomic loci, in comparison to unedited controls for each mutation. All samples were performed in independent transfection duplicates (n=2) and the mean of the quantified base editing formation values was calculated.

In another example of targeting disease-associated loci with SpRYc, Huntington's Disease (HD) is a monogenic dominant neurological disorder affecting more than 1 in 10000 adults [McColgan, P. & Tabrizi, S. J., "Huntington's disease: a clinical review:, European Journal of Neurology 25, 24-34 (2017)]. It is caused by an expanded CAG repeat on chromosome 4 of the HTT gene, which encodes an extended polyglutamine (polyQ) tract in the resulting huntingtin protein. Recent studies have shown that there is an inverse relationship between the age of disease onset and the number of continuous CAG repeats, with significant benefit of a natural interrupting CAA codon on age onset and severity of disease [Lee, J.-M. et al., "CAG repeat not polyglutamine length determines timing of Huntington's Disease onset", Cell 178, 887-900.e14 (2019)].

Figure 12:
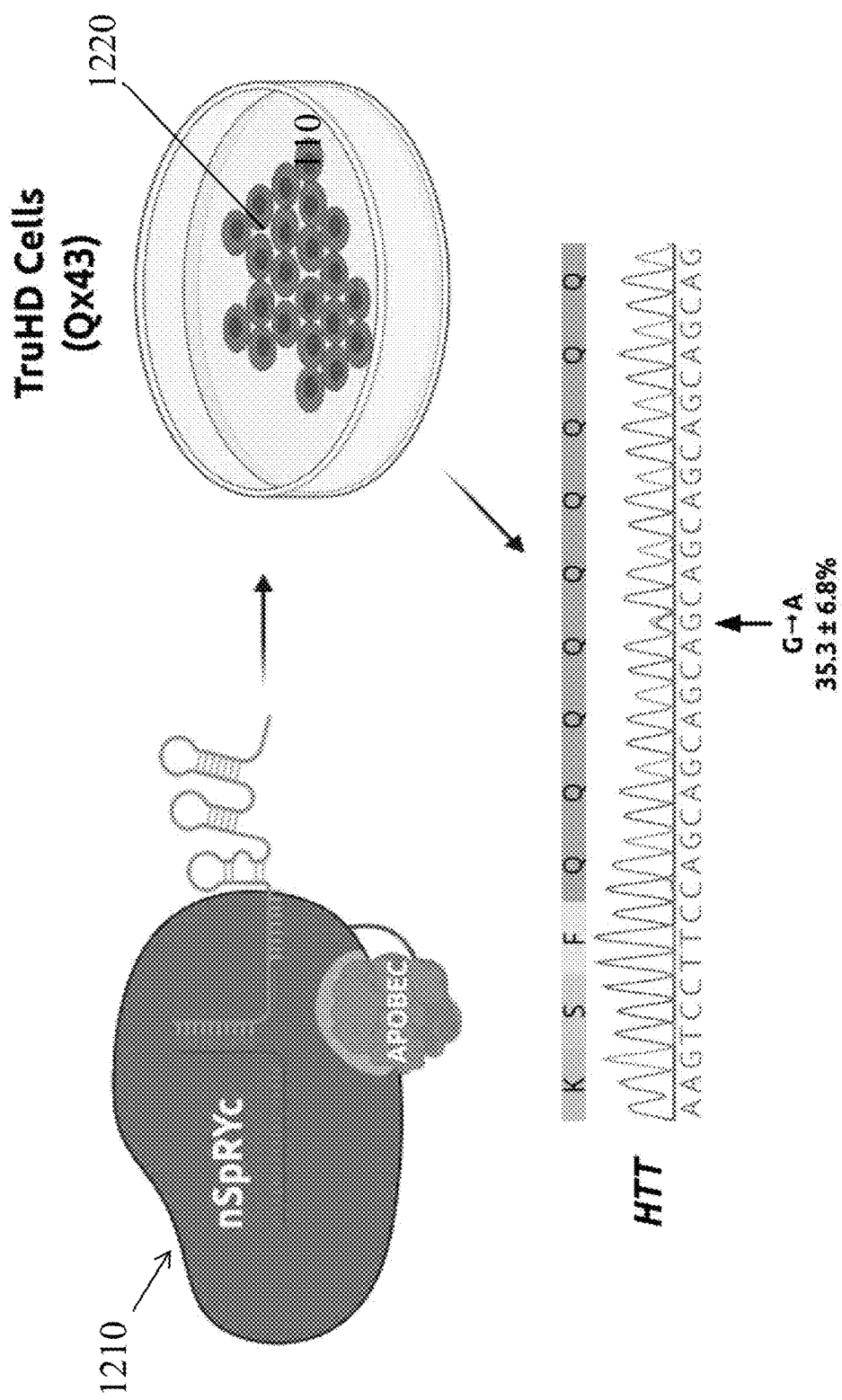
FIG. 12 is a schematic of an SpRYc HTT experiment targetting an HTT repeat [SEQ ID NO: 28], according to one aspect of the present invention.

SpRYc's ability to introduce silent CAA interruptions in the CAG repeat region of HTT was assessed. To do this, patient-derived TruHD fibroblast cells, possessing a clinically-relevant CAG repeat length of 43 repeats were transfected [Hung, C. L.-K. et al., "A patient-derived cellular model for Huntington's Disease reveals phenotypes at clinically relevant CAG lengths", Molecular Biology of the Cell 29, 2809-2820 (2018)]. These lines are hTert immortalized, but not transformed and are very genomically stable. A cytosine base editor SpRYc-BE4Max was used alongside an sgRNA targeting the antisense strand of the HTT repeat region [Koblan, L. W. et al., "Improving cytidine and adenine base editors by expression optimization and ancestral reconstruction", Nature Biotechnology 36, 843-846 (2018)] (Tables 1 and 2). The sequencing results show that SpRYc can install a CAA interruption at the fourth CAG repeat, with an editing efficiency of over 30%, thus reducing the uninterrupted repeat length by 4, reducing the CAG tract length to the sub-pathogenic range (FIG. 12). Taken together, these results illustrate SpRYc's potential utility for clinically-relevant applications and motivate its development as a therapeutic platform.

FIG. 12 is a schematic of an SpRYc HTT experiment. SpRYc-BE4Max 1210 was nucleofected into TruHD cells 1220 alongside an sgRNA targeting the HTT repeat [SEQ ID NO: 28]. Base editing conversion rate was determined via BEEP following PCR amplification of indicated genomic loci, in comparison to an unedited control. Samples were performed in independent nucleofection triplicates (n=3) and the mean of the quantified base editing formation values was calculated.

While PAMs play a critical role in self-nonself discrimination by prokaryotic CRISPR-Cas9 immune systems, they limit the accessible sequence space for genome editing applications. In the present invention, an optimized Cas9 is engineered by harnessing the structural properties of SpRY and Sc++ to generate SpRYc, a Cas9 with undetectable PAM preference. SpRYc may thus increase the targetable sequence space for expanded base editing capabilites, more efficient homology-directed repair, and multiplexed screening platforms. It has been further shown that SpRYc has reduced off-target effects as compared to SpRY, and due to high sequence homology of ScCas9 and SpCas9, it is anticipated that high-fidelity mutations [Chen, J. S. et al., "Enhanced proofreading governs CRISPR-Cas9 targeting accuracy", Nature 550, 407-410 (2017); Kleinstiver, B. P. et al., "High-fidelity CRISPR-Cas9 nucleases with no detectable genome-wide off-target effects", Nature 529, 490-495 (2016); Vakulskas, C. A. et al. ,"A high-fidelity Cas9 mutant delivered as a ribonucleoprotein complex enables efficient gene editing in human hematopoietic stem and progenitor cells", Nature Medicine 24, 1216-1224 (2018)] can easily be ported into SpRYc for improved specificity, as has been shown previously for both Sc++ and SpRY. Finally, it was demonstrated that SpRYc can be integrated within base editing architectures to edit disease-related loci for potential therapeutic purposes.

Recently, Collias and Beisel highlighted the implications of a PAM-free nuclease, indicating that though powerful, such a tool would have severe drawbacks [Collias, D. & Beisel, C. L., "CRISPR technologies and the search for the PAM-free nuclease", Nature Communications 12 (2021)]. For example, a PAM-free enzyme may edit its own sgRNA-expressing DNA construct and/or force interrogation of all target sequences in the genome, yielding hampered editing rates on-target while increasing accessibility to off-target sequences.

Figure 13:
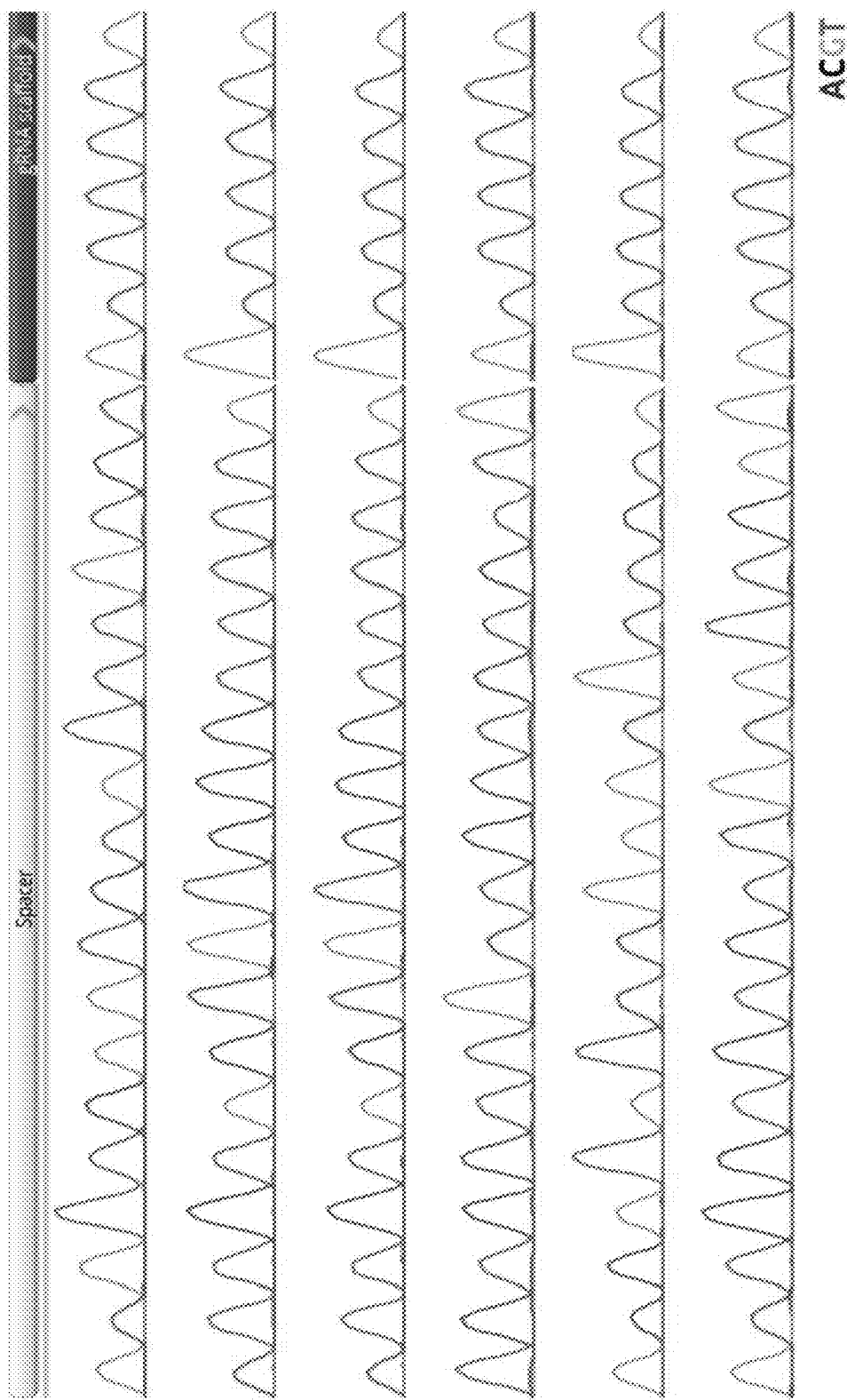
FIG. 13 illustrates sequencing of select SpRYc sgRNA DNA constructs from genomic DNA extracts.

FIG. 13 illustrates sequencing of select SpRYc sgRNA DNA constructs from genomic DNA extracts of HEK293T cells transfected with SpRYc nuclease and aforementioned sgRNA construct. During the genome editing experiments, the sgRNA plasmid cassette from various cell lysate samples was regularly amplified and sequenced and no detectable editing was observed (FIG. 13), suggesting that SpRYc may have impaired targeting at the 5'-GTTTAGAG-3' PAM within the canonical SpCas9 and ScCas9 sgRNA scaffold. Furthermore, editing rates similar to SpCas9 and SpRY on overlapping PAM sequences were observed, indicating no discernable trade-off between editing and accessibility. Finally, it was shown that SpRYc has reduced off-targeting and mismatch tolerance than SpRY. Thus, SpRYc may overcome many of the limitations associated with a PAM-free CRISPR tool.

While SpRYc serves as a step forward towards unrestricted, fully programmable genome editing, its development, more importantly, represents a culmination of a variety of state-of-the-art in silico and in vitro PAM engineering methods. ScCas9 was first identified via a high-throughput bioinformatics algorithm for ortholog discovery, dubbed SPAMALOT [Chatterjee, P., et al., "Minimal PAM specificity of a highly similar SpCas9 ortholog", Science Advances, 4, 10, eaau0766 (2018]. Its derivative, Sc++, was engineered by computationally identifying and extracting motifs from *Streptococcus* orthologs, and splicing them into ScCas9 for improved functionality [Chatterjee, P. et al., "An engineered ScCas9 with broad PAM range and high specificity and activity", Nature Biotechnology 38, 1154-1158 (2020)]. Concurrently, SpRY was the result of a multi-year effort of SpCas9-based directed evolution and rational mutagenesis [Walton, R. T., Christie, K. A., Whittaker, M. N. & Kleinstiver, B. P., "Unconstrained genome targeting with near-PAMless engineered CRISPR-Cas9 variants", Science (2020); Kleinstiver, M. S. Prew, S. Q. Tsai, V. V. Topkar, N. T. Nguyen, et al., "Engineered CRISPR-Cas9 nucleases with altered specificities", Nature 523, 481-485 (2015)]. Finally, a combination of structure-based homology modeling and domain grafting methods, those that were instrumental in engineering other PAM variants such as iSpyMac [Chatterjee, P. et al., "A Cas9 with PAM recognition for adenine dinucleotides", Nature Communications 11 (2020)] and cCas9 [Ma, D. et al., "Engineer chimeric Cas9 to expand PAM recognition based on evolutionary information", Nature Communications 10, 560 (2019)], enabled the fusion of SpRY and Sc++ into the final SpRYc variant. Together, these studies emphasize the power of integrating diverse engineering modalities to generate new and useful proteins and open the door for future integrative protein design.

Materials and Methods

Homology Modeling. Structural models of SpRYc were generated using the SWISS-MODEL server [Waterhouse, A. et al., "SWISS-MODEL: homology modelling of protein structures and complexes", Nucleic Acids Research 46, W296-W303 (2018)], using the PDB 4UN3 DNA substrate bound Cas9 model as template [Anders, C. & Jinek, M., "In vitro enzymology of Cas9", Methods in Enzymology 546, 1-20 (2014)]. Modelled sidechains and loop were curated and adjusted manually using COOT software [Emsley, P., Lohkamp, B., Scott, W. G. & Cowtan, K., "Features and development of Coot", Acta Crystallogr D Biol Cryst 66, 486-501 (2010)].

Generation of Plasmids. To generate SpRYc, the N-terminal ORF of Sc++ (Addgene Plasmid #155011), corresponding to residues (1-1119) was PCR amplified and assembled using Gibson Assembly into the pCMV-T7-SpRY-P2A-EGFP backbone (Addgene Plasmid #139989), preserving residues 1111-1368 of SpRY's ORF. pCMV-T7-SpCas9-P2A-EGFP (Addgene Plasmid #139987) was used for SpCas9, and Sc++ was similarly integrated within the backbone. Analogously, the ORFs of SpCas9, SpRY, and SpRYc were integrated within the ABE8e (Addgene Plasmid #138489) and AncBE4Max (Addgene Plasmid #112094) backbones. sgRNA plasmids were constructed by annealing oligonucleotides coding for crRNA sequences (Tables 1 and 2) as well as 4 bp overhangs, and subsequently performing a T4 DNA Ligase-mediated ligation reaction into a plasmid backbone immediately downstream of the human U6 promoter sequence. Assembled constructs were transformed into 50 µL NEB Turbo Competent *E. coli* cells, and plated onto LB agar supplemented with the appropriate antibiotic for subsequent sequence verification of colonies and plasmid purification.

PAM-SCANR Assay. Plasmids for the SpCas9 sgRNA and PAM-SCANR genetic circuit, as well as BW25113 ΔlacI cells, were generously provided by the Beisel Lab (North Carolina State University). Plasmid libraries containing the target sequence followed by either a fully-randomized 8-bp 5'-NNNNNNNN-3' library or fixed PAM sequences were constructed by conducting site-directed mutagenesis, utilizing the KLD enzyme mix (NEB) after plasmid amplification, on the PAM-SCALAR plasmid flanking the protospacer sequence (5'-CGAAAGGTTTTGCACTCGAC-3' [SEQ ID NO: 27]). Nuclease-deficient mutations (D10A and H850A) were introduced to the ScCas9 variants using Gibson Assembly as previously described. The provided BW25113 cells were made electrocompetent using standard glycerol wash and resuspension protocols. The PAM library and sgRNA plasmids, with resistance to kanamycin (Kan) and carbenicillin (Crb) respectively, were co-electroporated into the electrocompetent cells at 2.4 kV, outgrown, and recovered in Kan+Crb Luria Broth (LB) media overnight. The outgrowth was diluted 1:100, grown to AB S600 of 0.6 in Kan+Crb LB liquid media, and made electrocompetent. Indicated dCas9 plasmids, with resistance to chloramphenicol (Chl), were electroporated in duplicates into the electrocompetent cells harboring both the PAM library and sgRNA plasmids, outgrown, and collected in 5 mL Kan+Crb+Chl LB media. Overnight cultures were diluted to an AB S600 of 0.01 and cultured to an OD600 of 0.2. Cultures were analyzed and sorted on a FACSAria machine (Becton Dickinson). Events were gated based on forward scatter and side scatter and fluorescence was measured in the FITC channel (488 nm laser for excitation, 530/30 filter for detection), with at least 10,000 gated events for data analysis. Sorted GFP-positive cells were grown to sufficient density, plasmids from the pre-sorted and sorted populations were isolated, and the region anking the nucleotide library was then PCR amplified and submitted for Sanger sequencing or Amplicon-EZ NGS analysis (Genewiz). FCS files were analyzed using FCSalyzer, and gating strategy is described in FIG. 4.

Cell Culture and DNA Modification Analysis. HEK293T cells were maintained in DMEM supplemented with 100 units/ml penicillin, 100 mg/ml streptomycin, and 10% fetal bovine serum (FBS). sgRNA plasmids (100 ng) and nuclease plasmids (100 ng) were transfected into cells as duplicates (2×104/well in a 96-well plate) with Lipofectamine 3000 (Invitrogen) in Opti-MEM (Gibco). Five days after transfection, genomic DNA was extracted using QuickExtract Solution (Lucigen), and genomic loci were amplified by PCR utilizing the Phusion Hot Start Flex DNA Polymerase (NEB). Amplicons were enzymatically purified and submitted for Sanger sequencing or Amplicon-EZ NGS sequencing (Genewiz). Sanger sequencing ab1 files were analyzed using the ICE web tool for batch analysis (ice.synthego.com) [Hsiau, T. et al., "Inference of CRISPR edits from Sanger trace data" (2018)] in comparison to an unedited control to calculate indel frequencies via the ICE-D score. Select samples were further verified using the TIDE algorithm (tide.deskgen.com) to ascertain consistency of editing rates between replicates [Brinkman, E. K. & van Steensel, B., "Rapid quantitative evaluation of CRISPR genome editing by TIDE and TIDER", In Methods in Molecular Biology, 29-44, Springer New York, (2019)]. NGS FASTQ files were analyzed using a batch version of the software CRISPResso2 [Clement, K. et al., "CRISP-Resso2 provides accurate and rapid genome editing sequence analysis", Nature Biotechnology 37, 224-226 (2019)]. Base editing files were analyzed via the Based Editing Evaluation Program (BEEP) in comparison to an unedited control. All samples were performed in independent duplicates or triplicates, as indicated.

Guide-Seq. GUIDE-Seq was performed as previously described [Tsai, S. Q. et al., "GUIDE-seq enables genome-wide profiling of off-target cleavage by CRISPR-Cas nucleases", Nature Biotechnology 33, 187-197 (2014)]. Briefly, HEK293T cells were electroporated in a 24-well plate with 500 ng of Cas9, 500 ng of sgRNA, 10 ng of mCherry plasmids, and 7.5 pmol of annealed GUIDE-Seq oligonucleotide using the Neon nucleofection system (Thermo Fisher Scientific). After 72 hours post-nucleofection, genomic DNA was extracted with a DNeasy Blood and Tissue kit (Qiagen 69504) according to the manufacturer's protocol. DNA libraries were prepared using custom oligonucleotides described in Tsai, et al. Library preparations were done with original adaptors with each library barcoded for pooled sequencing. The barcoded, purified libraries were sequenced on a MiniSeq platform in a paired-end (150/150) run.

Raw sequencer output (BCL) was demultiplexed and aligned to hg38 using GS-Preprocess [Rodriguez, T. C. et al., "Genome-wide detection and analysis of CRISPR-cas off-targets", Progress in Molecular Biology and Translational Science, Elsevier (2021)]. This software also constructed a reference of UMIs unique to each read and merged technical replicate BAM files. Off-target analysis of this input was performed using the GUIDEseq Bioconductor package [Zhu, L. J. et al., "GUIDEseq: a bioconductor package to analyze GUIDE-seq datasets for CRISPR-Cas nucleases", BMC Genomics 18 (2017)]. Only sites that harbored a sequence with ≤10 mismatches relative to the gRNA were considered potential off-target sites. GUIDE-Seq read count data is shown in FIGS. 8A-B and 9A-B.

Rett Syndrome Cell Line Generation. The MECP2 editing locus containing all common Rett syndrome mutations was synthesized as a gBlock from IDT and inserted via Gateway cloning to a promoter-less PiggyBac pMVP destination vector (Addgene 121874) harboring puromycin resistance. The RTT vector was then integrated into the HEK293T cell line via lipofection. Briefly, 600,000 cells were seeded in D10 media (DMEM+10% FBS) to a six well plate 24 hours prior to lipofection. 2.5 ug of the RTT plasmid and 0.5 ug of a CMV-super PiggyBac transposase (System Biosciences) were then lipofected using Lipofectamine 3000 according to the manufacturer's protocol. Media was changed six hours post-transfection and cells were subjected to 1 ug/ml puromycin selection 48 hours post-transfection for 3 days. Cells were then expanded under no drug selection for three days to allow non-integrated plasmid loss, then again selected for 3 additional days to isolate a pure population.

TruHD Cell Culture. TruHD-Q43Q17M cells [Hung, C. L.-K. et al., "A patient-derived cellular model for Huntington's Disease reveals phenotypes at clinically relevant CAG lengths", Molecular Biology of the Cell 29, 2809-2820 (2018)] were cultured in MEM supplemented with 15% FBS and 1% Glutamax and grown under 4% O2 and 5% CO2 at 37 degrees C. in a 10 cm plate. At 95% confluence, cells were transfected through Lonza nucleofection using the SG Cell Line 4D-Nucleofector Kit. Growth media was replaced 24 hours post-nucleofection. 5 days post-nucleofection, genomic DNA was extracted with PureLink Genomic DNA MiniKit (Invitrogen).

Statistical Analysis. Data are shown as mean of duplicate values. Data was plotted using Matplotlib and the Prism GraphPad software.

For future in vitro and in vivo applications, the invention is compatible with additional delivery methods used for other CRISPR-Cas9 systems including, but not limited to, electroporation, viral infection, and nanoparticle injection. Embodiments can co-deliver the invention as a coding nucleic acid or protein, along with a gRNA. Components can also be stably expressed in cells.

At least the following aspects, implementations, modifications, and applications of the described technology are contemplated by the inventors and are considered to be aspects and extensions of the presently claimed invention:

(1) An isolated, engineered *Streptococcus canis* Cas9++ (Sc++) protein recombined with the PAM-interacting domain of an engineered *Streptococcus pyogenes* (SpRY) Cas9, or transgene expression thereof.

(2) Engineered CRISPR-associated DNA endonucleases with PAM interacting domain (PID) amino acid sequences that are at least 80% identical to that of an isolated, engineered *Streptococcus canis* Cas9++ (Sc++) protein recombined with the PAM-interacting domain of an engineered *Streptococcus pyogenes* (SpRY) Cas9.

(3) CRISPR-associated DNA endonucleases with a PAM specificity of 5-NNNNNNNN-3'.

(4) An isolated, engineered *Streptococcus pyogenes* Cas9 (SpCas9) protein with its PID as either the PID amino acid composition of the isolated protein in (1) or (2).

(5) A method of altering expression of at least one gene product comprising steps of introducing, into a eukaryotic cell containing and expressing a DNA molecule having a target sequence and encoding the gene product, an engineered, non-naturally occurring Clustered Regularly Interspaced Short Palindromic Repeats (CRISPR)-CRISPR associated (Cas) (CRISPR-Cas) system comprising one or more vectors comprising:
  (a) a regulatory element operable in a eukaryotic cell operably linked to at least one nucleotide sequence encoding a CRISPR system guide RNA that hybridizes with the target sequence, and
  (b) a second regulatory element operable in a eukaryotic cell operably linked to a nucleotide sequence encoding one or more isolated, engineered *Streptococcus canis* Cas9++ (Sc++) proteins recombined with the PAM-interacting domain of an engineered *Streptococcus pyogenes* (SpRY) Cas9, wherein components (a) and (b) are located on same or different vectors of the system, whereby the guide RNA targets the target sequence, and one or more isolated, engineered *Streptococcus canis* Cas9++ (Sc++) proteins recombined with the PAM-interacting domain of an engineered *Streptococcus pyogenes* (SpRY) Cas9 cleave the DNA molecule, whereby expression of the at least one gene product is altered, and wherein the proteins and the guide RNA do not naturally occur together.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention.

What is claimed is:

1. An isolated, engineered *Streptococcus canis* Cas9++ (Sc++) protein, wherein said Sc++ is modified at the N-terminus of said Sc++ with a PAM-interacting domain of an engineered *Streptococcus pyogenes* SpRY Cas9 protein.

2. The isolated, engineered protein of claim 1, comprising residues 1-1119 of Sc++ followed by residues 1111-1368 of SpRY.

3. An engineered chimeric CRISPR-associated DNA endonuclease with 5'-NNN-3' PAM preference comprising an isolated, engineered *Streptococcus canis* Cas9++ (Sc++) protein modified at the C-terminus with a PAM-interacting domain of an engineered *Streptococcus pyogenes* (SpRY) Cas9 protein.

4. The engineered endonuclease of claim 3, wherein the engineered endonuclease comprises residues 1-1119 of Sc++ followed by residues 1111-1368 of SpRY.

5. A method of altering expression of at least one gene product comprising steps of introducing, into a eukaryotic cell containing and expressing a DNA molecule having a target sequence and encoding the gene product, an engineered, non-naturally occurring Clustered Regularly Interspaced Short Palindromic Repeats (CRISPR)-CRISPR associated (Cas) (CRISPR-Cas) system comprising one or more vectors comprising:

(a) a regulatory element operable in a eukaryotic cell operably linked to at least one nucleotide sequence encoding a CRISPR system guide RNA that hybridizes with the target sequence, and (b) a second regulatory element operable in a eukaryotic cell operably linked to a nucleotide sequence encoding an isolated, engineered *Streptococcus canis* Cas9++ (Sc++) protein modified at the N-terminus of said Sc++ with a PAM-interacting domain of an engineered *Streptococcus pyogenes* SpRY Cas9 protein, wherein components (a) and (b) are located on same or different vectors of the system, whereby the guide RNA targets the target sequence, and the Sc++ protein modified with the PAM-interacting domain of an engineered *Streptococcus pyogenes* SpRY Cas9 cleaves the DNA molecule, whereby expression of the at least one gene product is altered, and wherein the protein and the guide RNA do not naturally occur together.

6. The method of claim 5, wherein the isolated engineered Sc++ protein comprises residues 1-1119 of Sc++ followed by residues 1111-1368 of SpRY.

* * * * *